(12) United States Patent
Ishikawa et al.

(10) Patent No.: US 11,077,734 B2
(45) Date of Patent: Aug. 3, 2021

(54) VEHICLE CONTROL SYSTEM WITH IDLING STOP CONTROL

(71) Applicant: DENSO CORPORATION, Kariya (JP)

(72) Inventors: Kimitake Ishikawa, Kariya (JP); Hideaki Kako, Kariya (JP); Hiroyasu Oide, Kariya (JP); Hideki Seki, Kariya (JP); Yusuke Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 16/095,451

(22) PCT Filed: Jan. 12, 2017

(86) PCT No.: PCT/JP2017/000805
§ 371 (c)(1),
(2) Date: Oct. 22, 2018

(87) PCT Pub. No.: WO2017/187668
PCT Pub. Date: Nov. 2, 2017

(65) Prior Publication Data
US 2019/0126722 A1    May 2, 2019

(30) Foreign Application Priority Data

Apr. 25, 2016 (JP) .............................. JP2016-087246

(51) Int. Cl.
*B60H 1/03* (2006.01)
*B60H 1/22* (2006.01)
(Continued)

(52) U.S. Cl.
CPC .......... *B60H 1/034* (2013.01); *B60H 1/2226* (2019.05); *F02D 29/02* (2013.01); *F02D 41/042* (2013.01);
(Continued)

(58) Field of Classification Search
CPC ............. B60H 1/034; B60H 1/2226; B60H 2001/2237; B60H 2001/2253;
(Continued)

(56) References Cited

U.S. PATENT DOCUMENTS 5,549,153 A * 8/1996 Baruschke ............ B60L 58/26
165/42
5,706,667 A * 1/1998 Iritani ................ B60H 1/00828
165/244

(Continued)

FOREIGN PATENT DOCUMENTS

JP        2001341520 A    12/2001
JP        2008126970 A     6/2008
(Continued)

*Primary Examiner* — Ljiljana V. Ciric
(74) *Attorney, Agent, or Firm* — Harness, Dickey & Pierce, P.L.C.

(57) ABSTRACT

The air-conditioning control device is configured to control an air conditioner for a vehicle having a radiant heater and to output a cancel signal that allows an engine, which has been stopped in response to an idling stop control, to restart. The radiant heater is configured to generate radiant heat to heat an occupant in a compartment of the vehicle. The air conditioner is configured to heat an interior of the compartment using engine cooling water. The air-conditioning control device stops the engine in response to the idling stop control. The air-conditioning control device outputs a cancel signal allowing the engine to restart following the engine having been stopped such that an idling stop time is longer when the radiant heater is operated than when the radiant heater is not operated.

2 Claims, 13 Drawing Sheets

(51) Int. Cl.
    *F02D 41/06*     (2006.01)
    *F02D 29/02*     (2006.01)
    *F02D 41/04*     (2006.01)
    *F02D 41/08*     (2006.01)

(52) U.S. Cl.
    CPC ......... *F02D 41/061* (2013.01); *F02D 41/065* (2013.01); *F02D 41/086* (2013.01); *B60H 2001/2237* (2013.01); *B60H 2001/2253* (2013.01); *B60H 2001/2262* (2013.01)

(58) Field of Classification Search
    CPC ........... B60H 2001/2262; F02D 41/061; F02D 29/02; F02D 41/042; F02D 41/065; F02D 41/086; F02N 2300/2011; F02N 11/0833; F02N 2200/0806; F02N 2200/0804; Y02T 10/40
    USPC .................................. 165/202, 203, 204, 271
    See application file for complete search history.

(56) References Cited

U.S. PATENT DOCUMENTS

| | | | | |
|---|---|---|---|---|
| 5,803,166 A * | 9/1998 | Ito | ...................... | B60H 1/00057 165/203 |
| 6,070,650 A * | 6/2000 | Inoue | ................... | B60H 1/3208 165/42 |
| 6,073,456 A * | 6/2000 | Kawai | .................. | B60W 10/06 62/133 |
| 6,152,105 A * | 11/2000 | Nishimura | ............... | F02D 37/02 123/339.11 |
| 6,330,909 B1 * | 12/2001 | Takahashi | .............. | F25B 41/062 165/202 |
| 6,358,180 B1 * | 3/2002 | Kuroda | ................... | B60K 6/543 477/4 |
| 6,532,926 B1 * | 3/2003 | Kuroda | .............. | B60H 1/00778 123/179.4 |
| 6,701,734 B1 * | 3/2004 | Ogawa | ............... | B60H 1/00735 62/133 |
| 6,889,762 B2 * | 5/2005 | Zeigler | .............. | B60H 1/00378 165/202 |
| 7,027,912 B1 * | 4/2006 | Metzger | ............. | B60H 1/00778 123/179.4 |
| 7,207,379 B2 * | 4/2007 | Takano | ................ | B60H 1/3208 165/202 |
| 7,247,123 B2 * | 7/2007 | Ohtake | ............... | F02N 11/0833 477/98 |
| 7,556,090 B2 * | 7/2009 | Asai | ................... | B60H 1/00792 165/202 |
| 7,562,535 B2 * | 7/2009 | Deiml | ............... | B60H 1/00735 62/115 |
| 8,612,092 B2 * | 12/2013 | Okamoto | ............. | B60H 1/0073 701/36 |
| 8,899,311 B2 * | 12/2014 | Misumi | .............. | B60H 1/00742 165/202 |
| 10,054,096 B2 * | 8/2018 | Berkson | ................. | B60H 1/008 |
| 10,183,547 B2 * | 1/2019 | Hall | ................... | B60H 1/00828 |
| 10,906,378 B2 * | 2/2021 | Bando | ................. | B60H 1/2218 |
| 10,913,327 B2 * | 2/2021 | Okamoto | ............. | B60H 1/032 |
| 2002/0107632 A1 * | 8/2002 | Fuse | .................. | F02N 11/0818 701/112 |
| 2003/0079873 A1 * | 5/2003 | Kuroda | .............. | B60H 1/00907 165/202 |
| 2003/0233835 A1 * | 12/2003 | Tomita | ................. | B60H 1/3208 62/133 |
| 2004/0020229 A1 * | 2/2004 | Adachi | ............... | B60H 1/3208 62/236 |
| 2004/0055305 A1 * | 3/2004 | Kuroda | .................. | F02N 11/003 60/698 |
| 2004/0089258 A1 * | 5/2004 | Buglione | ............. | B60W 10/06 123/179.4 |
| 2004/0144107 A1 * | 7/2004 | Breton | .................. | F02N 11/084 62/129 |
| 2004/0149246 A1 * | 8/2004 | Itoh | ........................ | B60K 6/547 123/179.4 |
| 2004/0211381 A1 * | 10/2004 | Ogawa | ................... | F02N 11/084 123/179.4 |
| 2004/0221833 A1 * | 11/2004 | Shepperson | .......... | F02D 41/083 123/339.16 |
| 2004/0231831 A1 * | 11/2004 | Houck | .................... | F02B 63/04 165/202 |
| 2005/0056413 A1 * | 3/2005 | Homan | ............... | B60H 1/00921 165/203 |
| 2005/0067200 A1 * | 3/2005 | Jiang | ..................... | B60W 10/06 180/65.25 |
| 2005/0193747 A1 * | 9/2005 | Kajimoto | ............ | B60H 1/00814 62/133 |
| 2005/0257926 A1 * | 11/2005 | Turner | .................. | B60H 1/3222 165/202 |
| 2006/0020385 A1 * | 1/2006 | Kakinuma | ................ | B62M 7/00 701/112 |
| 2007/0299560 A1 * | 12/2007 | LaHue | ................ | B60H 1/00964 700/276 |
| 2008/0006711 A1 * | 1/2008 | Ishida | ................. | B60H 1/00764 237/12.3 R |
| 2008/0132379 A1 * | 6/2008 | Matsubara | ............... | B60K 6/40 477/3 |
| 2008/0168766 A1 * | 7/2008 | Oomura | ................. | B60H 1/025 60/320 |
| 2008/0172170 A1 * | 7/2008 | Lecole | .................. | F02N 11/101 701/113 |
| 2008/0201064 A1 * | 8/2008 | DiGonis | ............. | F02N 11/0822 701/110 |
| 2008/0219866 A1 * | 9/2008 | Kwong | ................. | F02D 23/00 417/410.1 |
| 2008/0276913 A1 * | 11/2008 | Zubeck | ................. | B60K 6/442 123/543 |
| 2009/0143962 A1 * | 6/2009 | Tong | ..................... | F02D 41/042 701/112 |
| 2009/0145141 A1 * | 6/2009 | Akahoshi | ............. | B60H 1/3208 62/133 |
| 2009/0150025 A1 * | 6/2009 | Akahoshi | ............. | F02D 41/042 701/36 |
| 2009/0198438 A1 * | 8/2009 | Jinno | ........................ | B60H 1/04 701/110 |
| 2009/0314847 A1 * | 12/2009 | Nemoto | ............. | B60H 1/00885 237/5 |
| 2010/0011789 A1 * | 1/2010 | Carlson | .................. | B60H 1/004 62/158 |
| 2010/0030431 A1 * | 2/2010 | Potter | .................. | F02N 11/0803 701/45 |
| 2010/0089564 A1 * | 4/2010 | Nomura | ............... | B60H 1/00985 165/202 |
| 2010/0100306 A1 * | 4/2010 | Gamache | ............. | F02N 11/0803 701/113 |
| 2010/0206266 A1 * | 8/2010 | Tsunooka | ............... | F02D 31/008 123/339.18 |
| 2011/0109157 A1 * | 5/2011 | Tani | ........................ | F02D 41/40 307/9.1 |
| 2012/0118988 A1 * | 5/2012 | Lee | .......................... | B60L 58/34 237/12.3 R |
| 2012/0122000 A1 * | 5/2012 | Lee | ..................... | H01M 16/006 429/429 |
| 2012/0152512 A1 * | 6/2012 | Mori | ...................... | B60H 1/00864 165/202 |
| 2012/0234932 A1 * | 9/2012 | Okamoto | ............. | F24H 3/102 237/2 R |
| 2013/0206382 A1 * | 8/2013 | Ichishi | ................ | B60N 2/5692 165/203 |
| 2013/0211649 A1 * | 8/2013 | Tashiro | ................ | B60H 1/2218 701/22 |
| 2013/0291830 A1 * | 11/2013 | Doering | ..................... | B60K 6/387 123/350 |
| 2013/0297191 A1 * | 11/2013 | Gibson | ..................... | F02D 9/02 701/112 |
| 2014/0110489 A1 * | 4/2014 | Yasui | ................... | B60N 2/5685 237/5 |
| 2014/0136087 A1 * | 5/2014 | Kamatani | ............... | F02D 29/02 701/113 |

(56) References Cited

U.S. PATENT DOCUMENTS

| | | | |
|---|---|---|---|
| 2015/0107814 A1* | 4/2015 | Jeong | B60H 1/00764 |
| | | | 165/202 |
| 2015/0183296 A1* | 7/2015 | Ragazzi | B60H 1/2221 |
| | | | 219/205 |
| 2015/0191179 A1* | 7/2015 | Teraya | B60H 1/2218 |
| | | | 701/22 |
| 2015/0219056 A1* | 8/2015 | Boesch | F02N 11/003 |
| | | | 701/112 |
| 2016/0090958 A1* | 3/2016 | Berkson | B60H 1/00978 |
| | | | 701/112 |
| 2016/0137021 A1* | 5/2016 | Morisita | B60H 1/00007 |
| | | | 165/61 |
| 2016/0339900 A1* | 11/2016 | Li | B60K 6/46 |
| 2017/0368911 A1* | 12/2017 | Okamoto | B60H 1/025 |
| 2018/0043878 A1* | 2/2018 | Khafagy | F02N 11/084 |

FOREIGN PATENT DOCUMENTS

| | | |
|---|---|---|
| JP | 2012126330 A | 7/2012 |
| JP | 2012183969 A | 9/2012 |
| JP | 2014159204 A | 9/2014 |

\* cited by examiner

VEHICLE CONTROL SYSTEM WITH IDLING STOP CONTROL

CROSS REFERENCE TO RELATED APPLICATIONS

This application is a U.S. National Phase Application under 35 U.S.C. 371 of International Application No. PCT/JP2017/000805 filed on Jan. 12, 2017. This application is based on and claims the benefit of priority from Japanese Patent Application No. 2016-087246 filed on Apr. 25, 2016. The entire disclosures of all of the above applications are incorporated herein by reference.

TECHNICAL FIELD

The present disclosure relates to an air-conditioning control device and a vehicle control system.

BACKGROUND

Air-conditioning control devices are known to control an air-conditioning controller that performs, using engine cooling water, an air conditioning to heat an interior of a vehicle compartment.

Patent Document 1 discloses such air-conditioning control device that changes an opening degree of an air mix door of an air conditioner to increase a volume of warm air when an engine of a vehicle is stopped in response to an idling stop control while performing the heating operation heating the interior of the vehicle compartment. As such, the air-conditioning control device, in an idling stop mode, extends a time duration during which sensory warmth is applied to an occupant.

PRIOR ART DOCUMENT

Patent Document
Patent Document 1: JP 2012-126330 A

SUMMARY OF INVENTION

The inventors of the present disclosure studied Patent Document 1 in detail and found the following issues in the air-conditioning control device of Patent Document 1. According to the air-conditioning control device of Patent Document 1, the time duration during which the sensory warmth is applied to an occupant cannot be extended when the opening degree of the air mix door has been maximized toward a side increasing the volume of the warm air before the engine is stopped in response to the idling stop control.

In addition, the air-conditioning control device consumes heat of a heater core of the air conditioner in the idling stop mode. As such, an air outlet temperature, which is a temperature of air discharged by the air conditioner, may fall promptly. In such case, the time duration during which the sensory warmth is applied to an occupant in the idling stop mode may be shortened. Furthermore, vehicles may perform the idling stop control to allow the engine to restart based on a degree of a decrease in the air outlet temperature of the air conditioner or based on the air outlet temperature of the air conditioner. In such vehicles, the idling stop mode may be shortened when the air outlet temperature of the air conditioner falls promptly. As a result, fuel consumption may increase and whereby a volume of exhaust gas may increase.

It is an object of the present disclosure to provide an air-conditioning control device and a vehicle control system that can extend an idling stop time while suppressing a deterioration of sensory warmth applied to an occupant during the idling stop duration.

In one aspect of the present disclosure, the air-conditioning control device is configured to control an air conditioner for a vehicle having a radiant heater and to output a cancel signal that allows an engine, which has been stopped in response to an idling stop control, to restart. The radiant heater is configured to be supplied with power to heat an occupant in a vehicle compartment of the vehicle. The air conditioner is configured to heat an interior of the vehicle compartment using engine cooling water. The air-conditioning control device extends a stop time from stopping the engine in response to the idling stop control to outputting the cancel signal to be longer with the radiant heater being operated than with the radiant heater not being operated.

When a circulation of the engine cooling water stops when the engine stops in response to the idling stop control, an air outlet temperature, which is a temperature of air flowing out of the air conditioner, falls as a temperature of a heater core falls. When the air outlet temperature of the air conditioner falls, the sensory warmth applied to the occupant deteriorates. However, while the radiant heater is operating, the deterioration of the sensory warmth can be compensated by radiant heat from the radiant heater. As such, the air-conditioning control device can extend the stop time from stopping the engine in response to the idling stop control to outputting the cancel signal, which allows the engine having been stopped in response to the idling stop control to restart, to be longer with the radiant heater being operated than with the radiant heater not being operated. As such, since the air-conditioning control device can extend the time duration during which the idling stop mode is performed, the fuel consumption decreases whereby the volume of exhaust gas can be reduced.

According to the above-described air-conditioning control device, even when the idling stop control is performed with the engine cooling water having a relatively low temperature, the deterioration of the sensory warmth due to the decrease of the air outlet temperature of the air flowing out of the air conditioner can be compensated by the radiant heat from the radiant heater. As a result, the time duration during which the idling stop mode is performed can be extended.

In another aspect, the air-conditioning control device sets idling stop enabling conditions so that the engine is allowed to be stooped when a room temperature of the vehicle compartment is higher than a threshold room temperature or when a cooling water temperature is higher than a threshold water temperature. The threshold room temperature and the threshold water temperature are lower with the radiant heater being operated than with the radiant heater not being operated.

Therefore, the deterioration of the sensory warmth can be compensated by the radiant heat from the radiant heater while the radiant heater is operating when the engine stops in response to the idling stop control, when a room temperature of a vehicle compartment is low, and/or when the air outlet temperature, which is a temperature of air flowing out of the air conditioner, is low. As such, regarding the idling stop enabling condition for stopping the engine in response to the idling stop control, the air-conditioning control device sets the threshold room temperature or the threshold water temperature to be lower with the radiant heater being operated than with the radiant heater not being operated. As such, since the idling stop mode can be performed in various idling stop enabling conditions, the air-conditioning control device can decrease the fuel consumption thereby reducing the volume of exhaust gas.

In another aspect, a vehicle control system includes an air conditioner, a radiant heater, and an idling stop controller. The air conditioner heats an inside of a vehicle compartment using engine cooling water. The radiant heater is configured to increase a surface temperature thereof to heat the occupant using radiant heat. The idling stop controller stops the engine in response to an idling stop control and is configured to output a cancel signal allowing the engine to restart following the engine having been stopped in response to the idling stop control such that an idling stop time is longer when the radiant heater is operated than when the radiant heater is not operated.

As such, according to the vehicle control system, the time duration during which the idling stop mode is performed can be extended. As a result, the fuel consumption decreases, therefore the volume of exhaust gas can be reduced. In addition, the vehicle control system can extend the time duration, during which the idling stop mode is performed, even in a case where the idling stop mode is performed with the engine cooling water having a relatively low temperature.

The idling stop controller is configured by at least one of an air-conditioning control device or a vehicle control device.

DESCRIPTION OF EMBODIMENTS

Figure 1:
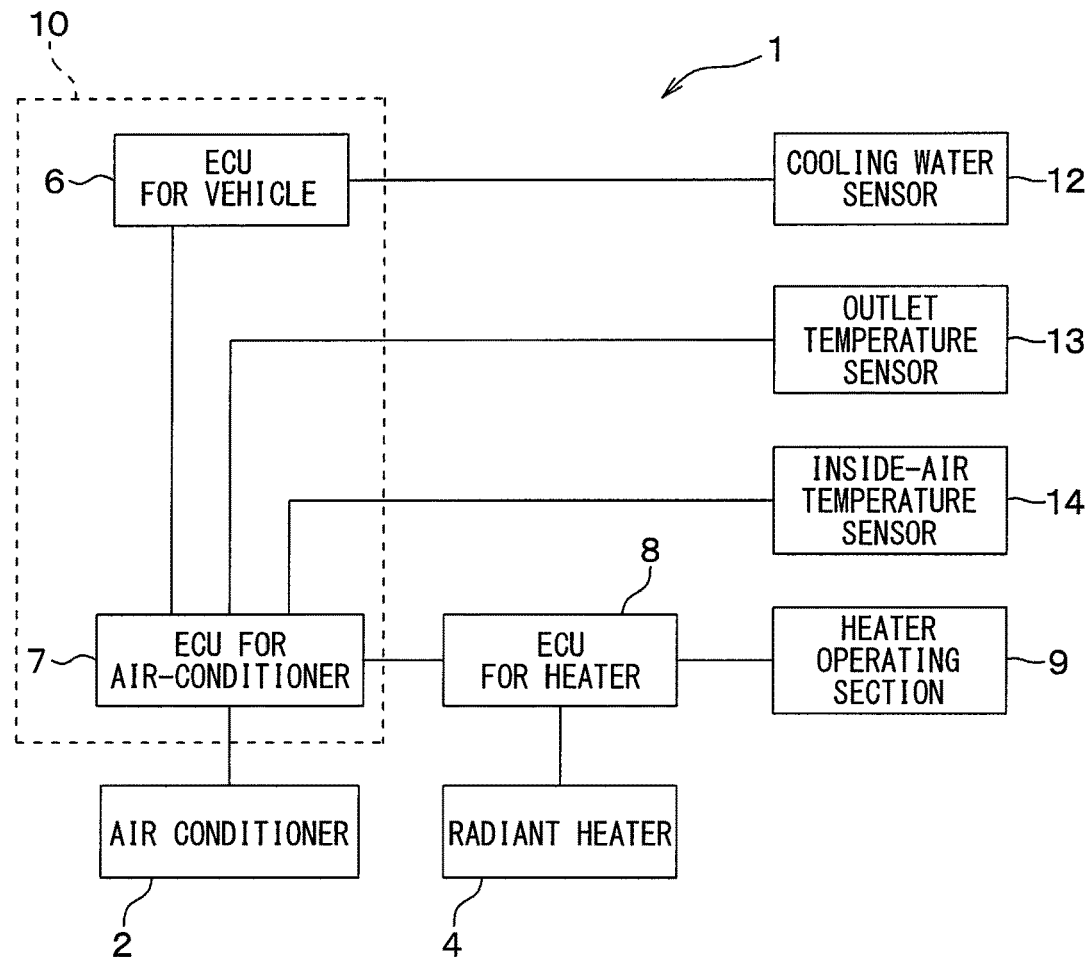
FIG. 1 is a diagram showing a vehicle control system according to a first embodiment.

Embodiments of the present disclosure will be described hereafter with reference to the drawings. In the following embodiments, the same or equivalent parts are denoted by the same reference numerals as each other, and explanations will be provided to the same reference numerals.

First Embodiment

A first embodiment will be described in detail hereafter with reference to the drawings. As shown in FIG. 1, in the present embodiment, a vehicle control system 1 is mounted to a vehicle including an air conditioner 2 that controls a temperature and/or a humidity of air in a vehicle compartment.

The air conditioner 2 includes a heater core (not shown) serving as a heating heat exchanger. The heater core allows air to pass therethrough. The air conditioner 2 heats the air by performing a heat exchange between the air and engine cooling water and discharges the heated air into the vehicle compartment, thereby heating the vehicle compartment. Additionally, the air conditioner 2 may include an evaporator (not shown) serving as a cooling heat exchanger. The evaporator allows air to pass therethrough. The air conditioner 2 cools the air by performing a heat exchange between the air and refrigerant and discharges the cooled air into the vehicle compartment, thereby cooling and dehumidifying the vehicle compartment.

Figure 2:
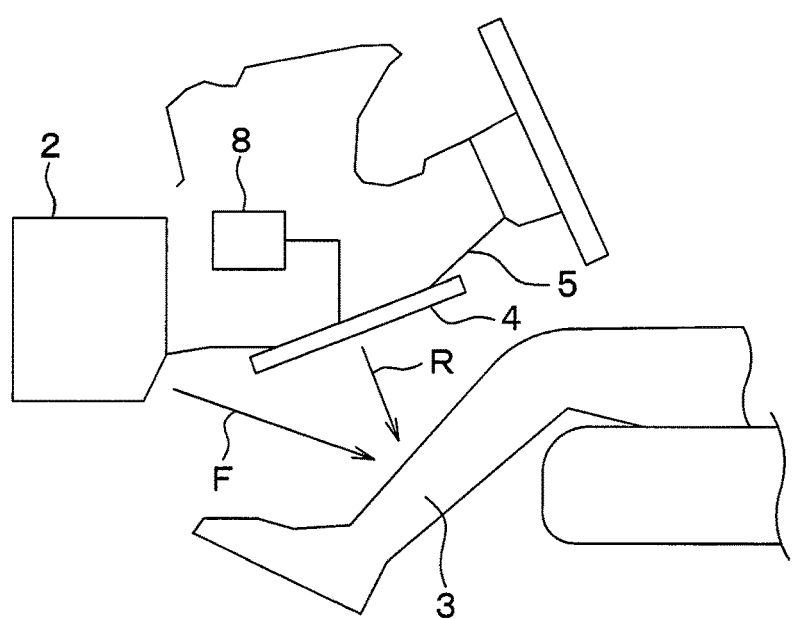
FIG. 2 is a diagram showing a locational relationship between a radiant heater and an occupant in a vehicle according to the first embodiment.

In FIG. 2, indicator allow F schematically shows air discharged from a FOOT outlet of the air conditioner 2 into the vehicle compartment. The air conditioner 2, when heating the vehicle compartment, discharges the heated air from the FOOT outlet to heat lower legs 3 and foot of an occupant.

The vehicle mounts a radiant heater 4 in the vehicle compartment. The radiant heater 4 is formed in a thin plate shape. The radiant heater 4 is an electric heater that is supplied with power from a power source, such as a battery or a generator or the like mounted in the vehicle, to generate heat. The radiant heater 4 includes a heat generating portion (not shown) supplied with power to generate infrared ray. The radiant heater 4 generates radiant heat by increasing a temperature of a surface thereof using the infrared ray. The temperature of the surface will be referred to as the surface temperature hereafter. For example, the heat generating portion may be made of alloy of copper and tin (i.e., Cu—Sn) or a metal such as silver, tin, stainless steel, nickel, nichrome, or alloy including at least one of silver, tin, stainless steel, nickel or nichrome.

The radiant heater 4 radiates radiant heat mainly along a direction perpendicular to the surface to heat an object facing the radiant heater 4 along the direction. The radiant heater 4 can apply sensory warmth to the occupant promptly. The radiant heater 4 is positioned to face the lower legs 3 of the occupant in a normal posture, which is a possible posture of the occupant when the occupant has a seat, and radiates radiant heat mainly toward the lower legs 3 and therearound. For example, the radiant heater 4 may be positioned below a steering column 5 supporting a steering wheel.

In FIG. 2, indicator allow R schematically shows radiant heat from the radiant heater 4. In the present embodiment, a portion of the occupant heated by the air conditioner 2 with conditioned air overlaps with a portion of the occupant heated by the radiant heater 4 with radiant heater. That is, the radiant heater 4 can heat, using radiant heat, the portion of the occupant including the portion of the occupant heated by the air conditioner 2 using the conditioned air.

As shown in FIG. 1, the vehicle control system 1 in the present embodiment includes a vehicle control device 6, an air-conditioning control device 7, and a heater control device 8. The vehicle control device 6 controls an engine mounted in the vehicle. The air-conditioning control device 7 controls the air conditioner 2. The heater control device 8 controls the radiant heater 4. Hereinafter, the vehicle control device 6 will be referred to as the vehicle ECU 6, the air-conditioning control device will be referred to as the air-conditioning ECU 7, and the heater control device 8 will be referred to as the heater ECU 8. Each of the vehicle ECU 6, the air-conditioning ECU 7, and the heater ECU 8 includes a microcomputer configured by CPU, ROM, RAM or the like and peripheral devices of the microcomputer. Each of the vehicle ECU 6, the air-conditioning ECU 7, and the heater ECU 8 performs various calculations and control processes in a manner that CPU runs programs stored in ROM or RAM. CPU corresponds to a controller. ROM and RAM are non-transitional physical storage media and correspond to a memory.

The vehicle ECU 6, the air-conditioning ECU 7, and the heater ECU 8 may be formed integrally with each other or may be formed separately from each other.

A heater control member 9 is mounted in the vehicle compartment of the vehicle. The heater control member 9 includes a heater operation switch that is operated by an occupant to start or stop the radiant heater 4. The heater ECU 8 controls the radiant heater 4 based on signals from the heater operation switch of the heater control member 9.

Additionally, the heater ECU 8 may decrease a temperature of the surface of the radiant heater 4 when the occupant touches the radiant heater 4.

The air-conditioning ECU 7 controls the air conditioner 2 and monitors the heater ECU 8 controlling the radiant heater 4. The air-conditioning ECU 7 transmits, to the vehicle ECU 6, an idling stop allowing signal that allows the engine to stop in response to the idling stop control and an idling stop cancel signal that allows the engine, which has been stopped in response to the idling stop control, to restart.

Various signals are input to the air-conditioning ECU 7. The various signals includes a signal output from an inside-air temperature sensor 14 that detects the room temperature of the vehicle compartment, and a signal output from an air outlet temperature sensor 13 that detects an air outlet temperature, which is a temperature of the conditioned air discharged from an air outlet of the air conditioner 2 into the vehicle compartment. A signal output from a cooling water sensor 12, which detects a temperature of the engine cooling water, is input to the vehicle ECU 6. The air-conditioning ECU 7 can obtain information about a temperature of the engine cooling water via the vehicle ECU 6. The temperature of the engine cooling water will be referred to as the cooling water temperature hereafter. Additionally or alternatively, a signal output from a cooling water sensor 12 is directly input to the air-conditioning ECU 7.

The air-conditioning ECU 7 transmits the idling stop allowing signal to the vehicle ECU 6, for example, when the room temperature of the vehicle compartment is higher than a threshold room temperature or when a temperature of the engine cooling water is higher than a threshold water temperature. The air-conditioning ECU 7 transmits the idling stop cancel signal to the vehicle ECU 6 when a specified timer time elapses from stopping the engine in response to the idling stop control.

The vehicle ECU 6 performs the idling stop control for the engine based on the idling stop allowing signal and the idling stop cancel signal. That is, the vehicle ECU 6 and the air-conditioning ECU 7 configure an idling stop controller 10 that performs the idling stop control for the engine.

In addition to the air-conditioning ECU 7, each of various ECUs (not shown) controlling various functions of the vehicle transmits, to the vehicle ECU 6, an idling stop allowing signal and an idling stop cancel signal based on a corresponding idling stop enabling condition and a corresponding idling stop cancel condition. The vehicle ECU 6 may perform the idling stop control for the engine based on the idling stop allowing signals and the idling stop cancel signals from the various ECUs.

The idling stop control performed by the vehicle control system 1 in the present embodiment will be described hereafter.

Figure 3:
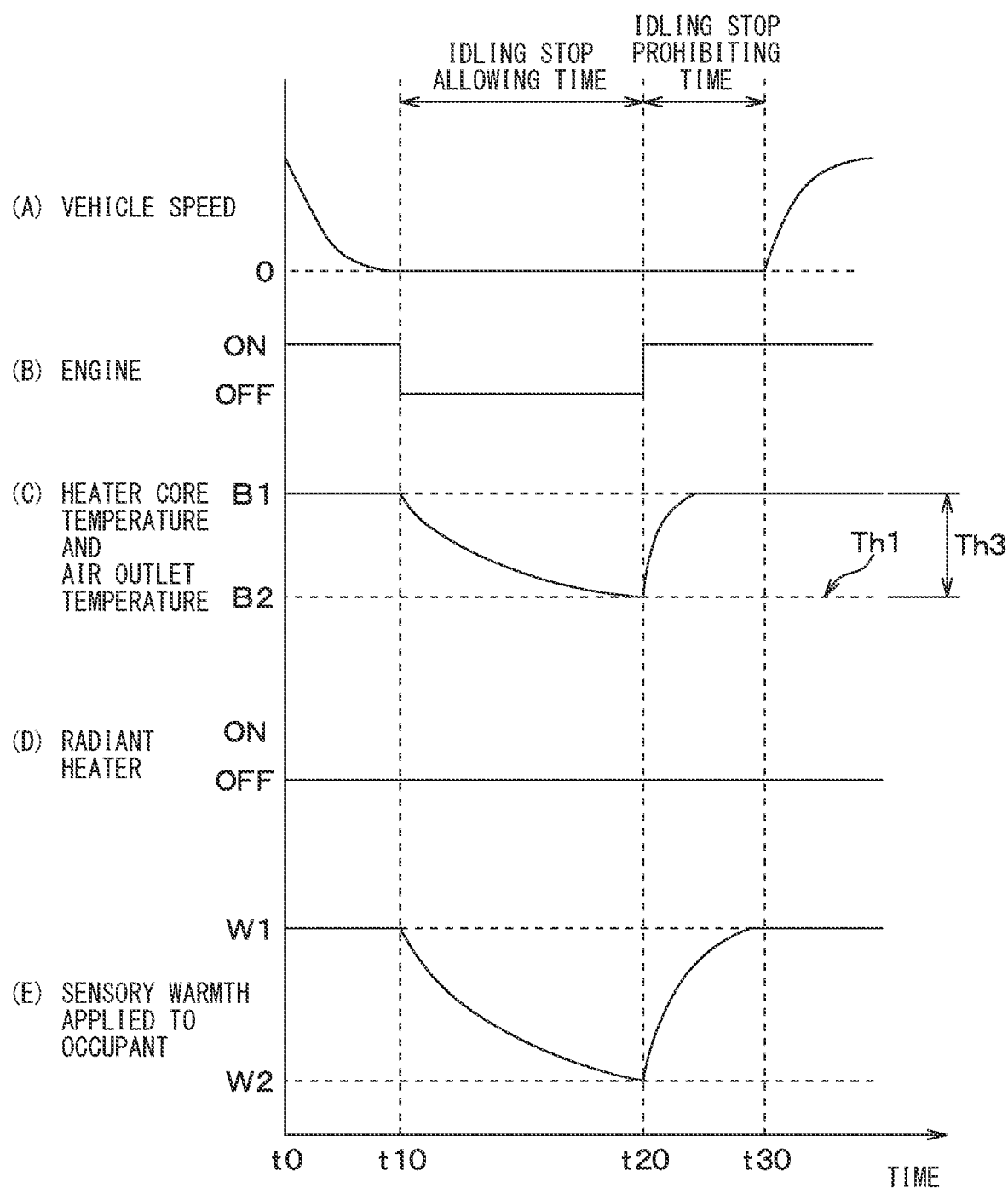
FIG. 3 is a time chart regarding the vehicle control system according to the first embodiment in a case where the radiant heater is stopped continuously from before starting an idling stop mode until after starting the idling stop mode.

FIG. 3 is a time chart in a case where the radiant heater 4 is not operated continuously from before starting the idling stop mode and until after starting the idling stop mode.

When a vehicle speed becomes zero or almost zero during a time from time t0 to time t10 as shown in FIG. 3(A) and the idling stop enabling condition for stopping the engine in response to the idling stop control is met, the vehicle ECU 6 stops the engine by the idling stop control at time t10 as shown in FIG. 3(B). Here, the idling stop enabling condition for stopping the engine in response to the idling stop control is met when the various ECUs including the air-conditioning ECU 7 outputs the idling stop allowing signals.

When the engine stops in response to the idling stop control, a circulation of engine cooling water stops. As such, as shown in FIG. 3(C), a temperature of the heater core configuring the air conditioner 2 falls from a temperature B1 after time t10, and the air outlet temperature falls as the temperature of the heater core falls.

As shown in FIG. 3(D), the radiant heater 4 has been stopped continuously from time t0.

As shown in FIG. 3(E), sensory warmth W1 is applied to the occupant before the engine stops. However, the sensory warmth deteriorates from the sensory warmth W1 as the air outlet temperature of the air conditioner 2 falls. At time t20, the sensory warmth deteriorates to sensory warmth W2 with which the occupant feels a certain level of cold.

The air-conditioning ECU 7 stores a timer time from a time at which the engine stops in response to the idling stop control to a time at which the sensory warmth becomes sensory warmth with which the occupant feels a certain level of cold. The timer time may be set in advance based on experimental results or may be set as required based on the room temperature of the vehicle compartment and the air outlet temperature.

When a specified timer time elapses from time t10, the air-conditioning ECU 7 transmits the idling stop cancel signal to the vehicle ECU 6 at time t20. Then, as shown in FIG. 3(B), the vehicle ECU 6 restarts the engine at time t20. As shown in FIG. 3(A), the vehicle has been stopped continuously at time t20, and the vehicle speed is zero from time t20 to time t30 at which the vehicle starts moving.

When the idling stop mode is canceled and the engine restarts, the air conditioner 2 allows the engine cooling water to circulate therein. As such, as shown in FIG. 3(C), a temperature of the heater core rises from a temperature B2 after time t20, and the air outlet temperature rises as the temperature of the heater core rises. As such, as shown in FIG. 3(E), the sensory warmth rises gradually from the sensory warmth W2 after time t20. The air outlet temperature is a temperature of air discharged from the air conditioner 2.

As shown in FIG. 3(A), the vehicle starts moving and the vehicle speed increases when a brake pedal is released and a gas pedal is operated at time t30.

Figure 4:
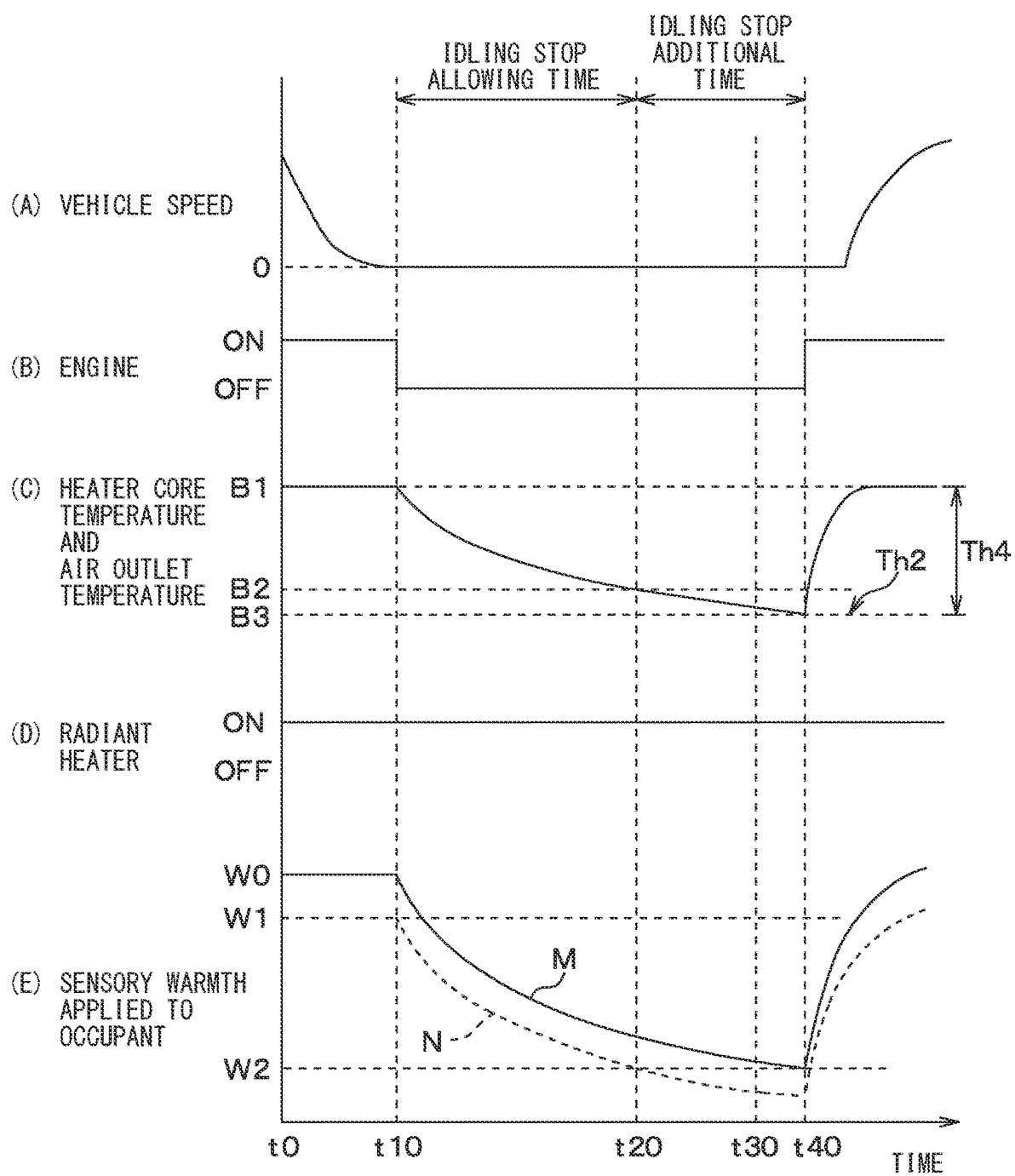
FIG. 4 is a time chart regarding the vehicle control system according to the first embodiment in a case where the radiant heater is operated continuously from before starting an idling stop mode until after starting the idling stop mode.

FIG. 4 is a time chart in a case where the radiant heater 4 is operated continuously from before starting the idling stop mode and until after starting the idling stop mode. The time chart shown in FIG. 3 and the time chart shown in FIG. 4 are under the same condition with the same factor such as ambient temperature, a thermal load of the vehicle (i.e., TAO which is a required temperature of air supplied into the vehicle compartment), and a state (e.g., a warm-up state) of the engine (i.e., a temperature of the engine cooling water). The air-conditioning ECU 7 may set the idling stop allowing time and/or the idling stop additional time with or without reference to factors such as the ambient temperature, the thermal load of the vehicle, or the warm-up state of the engine.

The idling stop allowing time from time t0 to time t20 shown in FIG. 3 is equal to the idling stop allowing time from time t10 to time t20 shown in FIG. 4.

When the vehicle speed becomes zero or almost zero during a time from time t0 to time t10 as shown in FIG. 4(A) and the idling stop enabling condition for stopping the engine in response to the idling stop control is met, the vehicle ECU 6 stops the engine by the idling stop control at time t10 as shown in FIG. 4(B).

As such, as shown in FIG. 4(C), a temperature of the heater core of the air conditioner 2 falls from the temperature B1 after time t10, and the air outlet temperature falls as the temperature of the heater core falls.

As shown in FIG. 4(D), the radiant heater 4 has been operated and applying radiant heat to the occupant from time to.

In FIG. 4(E), solid line M shows the sensory warmth applied to the occupant in a case where the radiant heater 4 is operated continuously from before starting the idling stop mode until after starting the idling stop mode. In FIG. 4(E), dashed line N shows the sensory warmth applied to the occupant in a case where the radiant heater 4 is stopped continuously from before starting the idling stop mode until after starting the idling stop mode.

The occupant is warmed by radiant heat from the radiant heater 4 when the radiant heater 4 is operated continuously from before starting the idling stop mode until after starting the idling stop mode. As such, from time t0 to time t0 in FIG. 4(E), the sensory warmth W0 shown by solid line M is greater (i.e., warmer) than the sensory warmth W1 shown by dashed line N. Therefore, after time t10, the sensory warmth, shown by solid line M, applied to the occupant deteriorates gradually as the air outlet temperature, which is a temperature of air flowing out of the air conditioner 2, falls, however being still greater (i.e., warmer) than the sensory warmth shown by dashed line N. As such, at time t40 a specified time after time t20, the sensory warmth, which is shown by solid line M, applied to the occupant becomes the sensory warmth W2 with which the occupant feels a certain level of cold.

In a case where the radiant heater 4 is operated continuously from before starting the idling stop mode until after starting the idling stop mode, the air-conditioning ECU 7 adds an additional timer time from time t20 to time t40 to a normal timer time from time t10 to time t20. When the time becomes time t40, i.e., the additional timer time elapses, the air-conditioning ECU 7 transmits the idling stop cancel signal to the vehicle ECU 6. Then, as shown in FIG. 4(B), the vehicle ECU 6 restarts the engine at time t40.

When the engine restarts at time t40, the engine cooling water starts circulating in the air conditioner 2. As such, as shown in FIG. 4(C), a temperature of the heater core rises from a temperature B3 after time t40, and the air outlet temperature rises as the temperature of the heater core rises. The air outlet temperature is a temperature of air discharged from the air conditioner 2. Therefore, as shown by solid line M in FIG. 4(E), the sensory warmth applied to the occupant rises gradually from the sensory warmth W2 after time t40.

As shown in FIG. 4(A), the vehicle speed increases after the vehicle starts moving at time 40.

Figure 5:
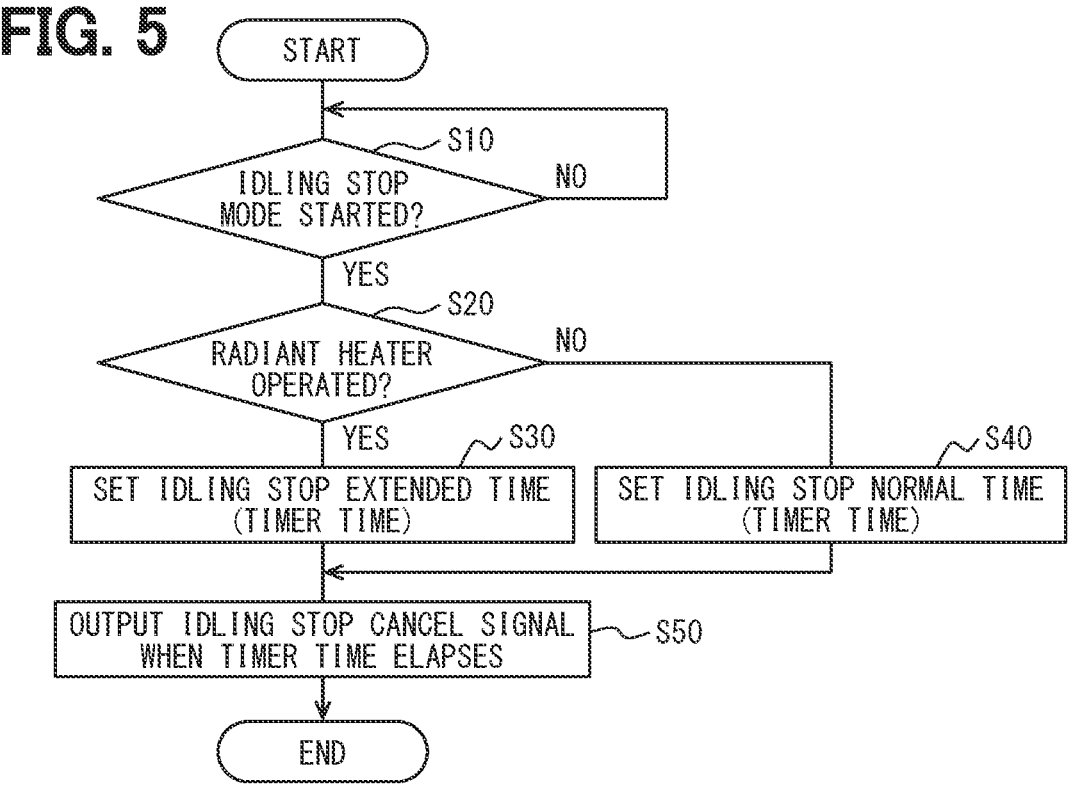
FIG. 5 is a flowchart of a control process, in the idling stop mode, of an air-conditioning control device of the vehicle control system according to the first embodiment.

A control procedure performed by the air-conditioning ECU 7 in the idling stop mode in the present embodiment will be described hereafter with reference to a flowchart shown in FIG. 5.

At step S10, the air-conditioning ECU 7 determines whether the vehicle ECU 6 stops the engine in the idling stop control. The vehicle ECU 6 and the air-conditioning ECU 7 transmit control information therebetween using an in-vehicle network such as CAN (Controller Are Network). The air-conditioning ECU 7 repeats the determination until the engine stops in response to the idling stop control.

The control procedure advances to step S20 when the air-conditioning ECU 7 determines that the engine is stopped in response to the idling stop control.

At step S20, the air-conditioning ECU 7 serves as a determination section and determines whether the radiant heater 4 is operating. The air-conditioning ECU 7 monitors a control performed by the heater ECU 8 to control the radiant heater 4. As such, the control procedure advances to step S30 when the air-conditioning ECU 7 determines that the radiant heater 4 is operating.

The air-conditioning ECU 7 serves as a time extending section at step S30 so as to set a stop time, during which the engine is allowed to be stopped continuously in response to the idling stop control, to a timer time which is a total time of the normal timer time and the additional timer time. In the following description, the timer time which is the total time of the normal timer time and the additional timer time will be referred to as an extended timer time. The extended timer time is set in advance based on a time duration from a time at which the engine stops in response to the idling stop control to a time at which the occupant starts feeling a certain level of cold while the radiant heater 4 is operated. The time duration may be determined from experimental results. The air-conditioning ECU 7 stores the extended timer time therein. Additionally or alternatively, the extended timer time may be set based on the room temperature of the vehicle compartment and the air outlet temperature.

The extended timer time is a total of idling stop allowing time and idling stop additional time and corresponds to a time duration from time t10 to time 40.

The control procedure advances to step S40 when the air-conditioning ECU 7, at step S20, determines that the radiant heater 4 is stopped.

At step s40, the air-conditioning ECU 7 sets the normal timer time as the stop during which the engine is allowed to be stopped continuously in response to the idling stop control.

The normal timer time is set in advance based on a duration from a time at which the engine stops in response to the idling stop control to a time at which the occupant starts feeling a certain level of cold while the radiant heater 4 is stopped. The time duration may be determined from experimental results. The air-conditioning ECU 7 stores the extended timer time therein. Additionally or alternatively, the normal timer time may be set based on the room temperature of the vehicle compartment and the air outlet temperature.

The normal timer time is shown as idling stop allowing time in time charts in FIG. 3 and FIG. 4 and corresponds to a duration from time t10 to time t20.

When the extended timer time set at step S30 or the normal timer time set at step S40 elapses, the air-conditioning ECU 7 transmits the idling stop cancel signal to the vehicle ECU 6 at step S50. When the idling stop cancel signal is transmitted from the air-conditioning ECU 7, the vehicle ECU 6 restarts the engine which has been stopped in response to the idling stop control.

According to the air-conditioning ECU 7 in the first embodiment described above, the following effects can be obtained.

(1) In the first embodiment, the air-conditioning ECU 7 sets the stop time from stopping the engine in response to the idling stop control to outputting the cancel signal, which allows the engine having been stopped in the idling stop control to restart, to be longer with the radiant heater 4 being operated than with the radiant heater 4 not being operated. The stop time with the radiant heater 4 being operated and the stop time with the radiant heater 4 not being operated were measured on the same condition with the same factors such as ambient temperature, a thermal load of the vehicle, and/or state of the engine, e.g., warm-up state of the engine. The air-conditioning ECU 7 may set the normal timer time and the extended timer time with or without reference to factors such as ambient temperature, a thermal load of the vehicle, or state of the engine, e.g., warm-up state of the engine.

Thus, when the engine stops in response to the idling stop control, the deterioration of the sensory warmth due to the decrease of the air outlet temperature of the air conditioner 2 can be compensated by radiant heat from the radiant heater 4. As such, the air-conditioning ECU 7 can extend the stop time from stopping the engine in response to the idling stop control to outputting the cancel signal, which allows the engine having been stopped in the idling stop control to restart, to be longer with the radiant heater 4 being operated than with the radiant heater 4 not being operated. As such, since the air-conditioning ECU 7 can extend the time duration during which the idling stop mode is performed, the fuel consumption decreases whereby the volume of exhaust gas can be reduced.

Moreover, according to the air-conditioning ECU 7, even when the idling stop control is performed with the engine cooling water having a relatively low temperature, the deterioration of the sensory warmth, applied to the occupant, due to the decrease of the air outlet temperature of the air conditioner 2 can be compensated by radiant heat from the radiant heater 4. As a result, the time duration during which the idling stop mode is performed can be extended.

(2) In the above-described first embodiment, the air-conditioning ECU 7 sets the timer time with the radiant heater 4 being operating to be longer than the timer time with the radiant heater 4 not being operated. In this comparison, the timer time while the radiant heater 4 is operating and the timer time while the radiant heater 4 is not operated were measured on the same condition with same factors such as ambient temperature, a thermal load of the vehicle, or state of the engine, e.g., warm-up state of the engine. The air-conditioning ECU 7 may set the timer time with or without reference to factors such as ambient temperature, a thermal load of the vehicle, or state of the engine, e.g., warm-up state of the engine.

The air-conditioning ECU 7 transmits the cancel signal, which allows the engine to restart, based on the timer time that elapses from a time at which the idling stop mode is started. Therefore, the control procedure (or control program) performed by the air-conditioning ECU 7 can be simplified.

(3) In the first embodiment, the radiant heater 4 is positioned to heat an area including at least a part of an area heated by air flowing from the FOOT outlet of the air conditioner 2 toward the occupant.

As such, the deterioration of the sensory warmth, applied to the occupant, due to the decrease of the air outlet temperature of the air conditioner 2 in the idling stop mode can be compensated by radiant heat from the radiant heater 4.

(4) In the first embodiment, the air-conditioning ECU 7 includes the determination section at step S20 and the time extending section at step S30. The determination section determines whether the radiant heater 4 is operating. The time extending section extends the stop time from stopping the engine in response to the idling stop control to outputting the cancel signal, which allows the engine having been stopped in the idling stop control to restart, to be longer with the radiant heater 4 being operated than with the radiant heater 4 not being operated.

First Modification Example

A first modification example of the above-described first embodiment will be described hereafter. The first modification example is different from the first embodiment in a criterion for determining whether to output a cancel signal, which allows the engine restarts, from the air-conditioning ECU 7. Other configurations of the first modification example are the same as the first embodiment. In the following description of the first modification example, only parts different from the first embodiment will be described.

In the first modification example, the air-conditioning ECU 7 stores the temperature of the heater core or the air outlet temperature with which the occupant feels a certain level of cold, for each of a case where the radiant heater 4 is operated and a case where the radiant heater 4 is stopped. The temperature of the heater core or the air outlet temperature may be set in advance based on experimental results or may be set as required based on a factor such as the room temperature of the vehicle.

In FIG. 3(C), a threshold temperature Th1 is shown as the temperature of the heater core or the air outlet temperature, with the radiant heater 4 not being operated, with which the occupant feels a certain level of cold. In FIG. 4(C), a threshold temperature Th2 is shown as the temperature of the heater core or the air outlet temperature, with the radiant heater 4 being operated, with which the occupant feels a certain level of cold.

In the first modification example, the air-conditioning ECU 7 sets the threshold temperature Th2 with the radiant heater 4 being operated in the idling stop mode to be lower than the threshold temperature Th1 with the radiant heater 4 not being operated in the idling stop mode. The reason is that the deterioration of the sensory warmth due to the decrease of the air outlet temperature of the air conditioner 2 is compensated by radiant heat from the radiant heater 4 when the radiant heater 4 is operating in the idling stop mode.

As shown in FIG. 3(C), in a case where the radiant heater 4 is not operated continuously from before starting the idling stop mode until after starting the idling stop mode, the temperature of the heater core or the air outlet temperature falls gradually from the temperature B1 after time t10. When the temperature of the heater core or the air outlet temperature becomes the threshold temperature Th1 or lower at time t20, the air-conditioning ECU 7 transmits the idling stop cancel signal to the vehicle ECU 6. Thus, the vehicle ECU 6 restarts the engine.

Similarly, as shown in FIG. 4(C), in a case where the radiant heater 4 is operated continuously from before starting the idling stop mode until after starting the idling stop mode, the temperature of the heater core or the air outlet temperature falls gradually from the temperature B1 after time t10. In this case, as described above, the air-conditioning ECU 7 sets the threshold temperature Th2 to be lower than the threshold temperature Th1 shown in FIG. 3(C). When the temperature of the heater core or the air outlet temperature becomes the threshold temperature Th2 or lower at time t40 past time t20, the air-conditioning ECU 7 transmits the idling stop cancel signal to the vehicle ECU 6. Thus, the vehicle ECU 6 restarts the engine.

In the above-described first modification example, the air-conditioning ECU 7 sets the threshold temperature Th2 with the radiant heater 4 being operated to be lower than the threshold temperature Th1 with the radiant heater 4 not being operated. Here, the threshold temperature Th1 with the radiant heater 4 being operated and the threshold temperature Th2 with the radiant heater 4 not being operated were measured on the same condition with same factors such as ambient temperature, a thermal load of the vehicle, or state of the engine, e.g., warm-up state of the engine. The air-conditioning ECU 7 may set the threshold temperature with or without reference to factors such as ambient temperature, a thermal load of the vehicle, or state of the engine, e.g., warm-up state of the engine.

In the first modification example, similar to the first embodiment, the air-conditioning ECU 7 can extend the stop time from stopping the engine in response to the idling stop control to outputting the cancel signal, which allows the engine having been stopped in the idling stop control to restart, to be longer with the radiant heater 4 being operated than with the radiant heater 4 not being operated. In the first modification example, the sensory warmth applied to the occupant can be estimated based on a temperature of the heater core of the air conditioner 2 or the air outlet temperature of the air conditioner 2. As such, the air-conditioning ECU 7 can apply a more comfortable feeling to the occupant by controlling the temperature accurately.

Second Modification Example

A second modification example of the above-described first embodiment will be described hereafter. The second modification example is different from the first embodiment in a criterion for determining whether to output a cancel signal, which allows the engine restarts, from the air-conditioning ECU 7.

A temperature of the heater core before starting the idling stop mode or an air outlet temperature, which is a temperature of air supplied into the vehicle compartment, before starting the idling stop mode (referred to as a previous temperature collectively), may fall by a specified range and apply a certain level of cold to the occupant. Hereafter, a temperature of the heater core or an air outlet temperature, which is the specified range lower than the previous temperature and which applies the certain level of cold to the occupant, will be referred to as a following temperature collectively. In the second modification example, the air-conditioning ECU 7 stores a temperature difference between the previous temperature and the following temperature, for each of a case where the radiant heater 4 is operated and a case where the radiant heater 4 is stopped. The temperature difference between the previous temperature and the following temperature may be set in advance based on experimental results or may be set as required based on a factor such as the room temperature of the vehicle.

In FIG. 3(C), a threshold temperature difference Th3 is shown as the temperature difference between the previous temperature and following temperature with the radiant heater 4 not being operated. In FIG. 4(C), a threshold temperature difference Th4 is shown as the temperature difference between the previous temperature and the following temperature with the radiant heater 4 being operated.

In the second modification example, the air-conditioning ECU 7 sets the threshold temperature difference Th4 with the radiant heater 4 being operated in the idling stop mode to be greater than the threshold temperature difference Th3 with the radiant heater 4 not being operated in the idling stop mode. The reason is that the deterioration of the sensory warmth due to the decrease of the air outlet temperature of the air conditioner 2 is compensated by radiant heat from the radiant heater 4 when the radiant heater 4 is operating in the idling stop mode.

FIG. 3(C) shows a case where the radiant heater 4 is not operated continuously from before starting the idling stop mode until after starting the idling stop mode. In this case, a difference between the previous temperature B1 (in the temperature of the heater core or an air outlet temperature) at time t10 and the following temperature B2 (in the temperature of the heater core or an air outlet temperature) at time t20 becomes the threshold temperature difference Th3 or greater. The air-conditioning ECU 7 transmits the idling stop cancel signal to the vehicle ECU 6 at time t20. Thus, the vehicle ECU 6 restarts the engine.

FIG. 4(C) shows a case where the radiant heater 4 is operated continuously from before starting the idling stop mode until after starting the idling stop mode. In this case, a difference between the previous temperature B1 (in the temperature of the heater core or an air outlet temperature) at time t0 and the following temperature B3 (in the temperature of the heater core or an air outlet temperature) at time t40 becomes the threshold temperature difference Th4 or greater. The air-conditioning ECU 7 transmits the idling stop cancel signal to the vehicle ECU 6 at time 40. Thus, the vehicle ECU 6 restarts the engine.

In the above-described second modification example, the air-conditioning ECU 7 sets the threshold temperature difference Th4 with the radiant heater 4 being operated to be greater than the threshold temperature difference Th1 with the radiant heater 4 not being operated. Here, the threshold temperature difference Th3 with the radiant heater 4 not being operated and the threshold temperature difference Th4 with the radiant heater 4 being operated were measured on the same condition with same factors such as ambient temperature, a thermal load of the vehicle, or state of the engine, e.g., warm-up state of the engine. The air-conditioning ECU 7 may set the threshold temperature differences with or without reference to factors such as ambient temperature, a thermal load of the vehicle, or state of the engine, e.g., warm-up state of the engine.

In the second modification example, similar to the first embodiment, the air-conditioning ECU 7 can extend the stop time from stopping the engine in response to the idling stop control to outputting the cancel signal, which allows the engine having been stopped in the idling stop control to restart, to be longer with the radiant heater 4 being operated than with the radiant heater 4 not being operated. In the second modification example, the sensory warmth applied to the occupant can be estimated based on a range of decreasing in the temperature of the heater core of the air conditioner 2 or a range of decreasing in the air outlet temperature of the air conditioner 2. As such, the air-conditioning ECU 7 can apply a more comfortable feeling to the occupant by controlling the temperature accurately.

Second Embodiment

A second embodiment will be described hereafter. In the second embodiment, the idling stop control is performed by at least one of the vehicle ECU 6 and the air-conditioning ECU 7 configuring the idling stop controller 10 shown in FIG. 2. The vehicle ECU 6 and the air-conditioning ECU 7 may be formed integrally with each other or may be formed separately from each other.

Figure 6:
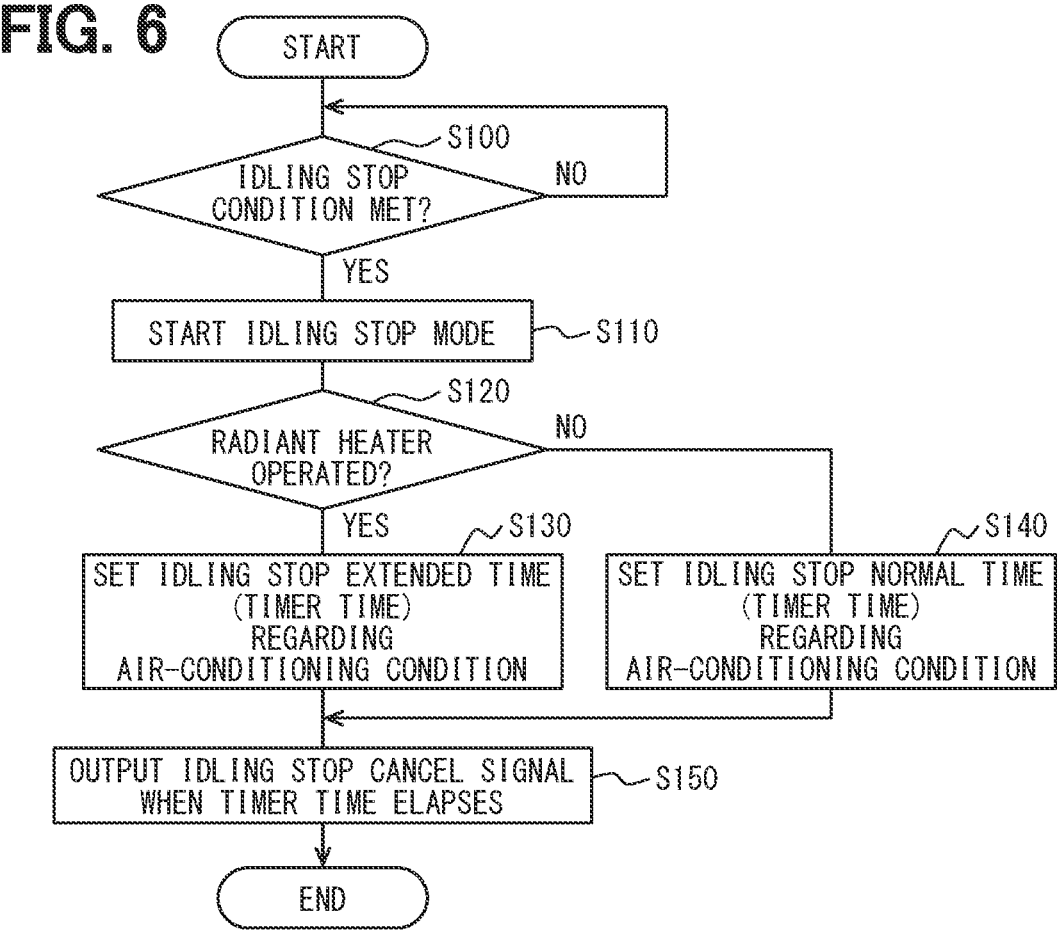
FIG. 6 is a flowchart of a vehicle control system in the idling stop mode according to a second embodiment.

A control procedure performed by the idling stop controller 10 in the second embodiment will be described hereafter with reference to the flowchart shown in FIG. 6.

At step S100, the idling stop controller 10 determines whether the specified idling stop enabling condition to stop the engine in idling stop control is met. The specified condition may be that the vehicle speed is zero or substantially zero. Additionally, the specified idling stop enabling condition may be, regardless of the vehicle speed, that the room temperature of the vehicle compartment is higher than a threshold room temperature, a temperature of the engine cooling water is higher than a threshold water temperature, or a voltage of a battery is higher than a specified value.

When any one of the idling stop enabling conditions to stop the engine in the idling stop control is not met, the idling stop controller 10 repeats the determination of step S100. When all of the idling stop enabling conditions to stop the engine in the idling stop control are met, the idling stop controller 10 advances the control procedure to step S110. At step S110, the idling stop controller 10 stops the engine and starts the idling stop mode.

Subsequently, at step S120, the idling stop controller 10 determines whether the radiant heater 4 is operating. When the idling stop controller 10 determines that the radiant heater 4 is operating, the control procedure advances to step S130.

At step S130, the idling stop controller 10 sets the extended timer time as the stop time, during which the engine is allowed to be stopped continuously in response to the idling stop control, regarding an air-conditioning condition for continuing the idling stop mode.

The control procedure advances to step S140 when the idling stop controller 10, at step S120, determines that the radiant heater 4 is not operated.

At step S140, the idling stop controller 10 sets the normal timer time as the stop time, during which the engine is allowed to be stopped continuously in response to the idling stop control, regarding the air-conditioning condition for continuing the idling stop mode.

When the extended timer time set at step S130 or the normal timer time set at step S140 elapses, the idling stop controller 10 cancel the engine stop signal and restarts the engine, which is stopped in response to the idling stop control.

In the above-described second embodiment, the idling stop control is performed by at least one of the vehicle ECU 6 and the air-conditioning ECU 7 configuring the idling stop controller 10. The idling stop controller 10 extends the stop time from stopping the engine in response to the idling stop control to outputting the cancel signal, which allows the engine having been stopped in the idling stop control to restart, to be longer with the radiant heater being operated than with the radiant heater not being operated. The stop time with the radiant heater 4 being operated and the stop time with the radiant heater 4 not being operated were measured on the same condition with the same factors such as ambient temperature, a thermal load of the vehicle, and/or state of the engine, e.g., warm-up state of the engine. The idling stop controller 10 may set the normal timer time and the extended timer time with or without reference to factors such as ambient temperature, a thermal load of the vehicle, or state of the engine, e.g., warm-up state of the engine.

As such, according to the vehicle control system 1, the time duration during which the idling stop mode is performed can be extended. As a result, the fuel consumption decreases, therefore the volume of exhaust gas can be reduced. In addition, the vehicle control system 1 can extend the time duration, during which the idling stop mode is performed, even in a case where the idling stop mode is performed with the engine cooling water having a relatively low temperature.

Third Embodiment

A third embodiment will be described hereafter. The following embodiments including the present embodiment are on the premise of that the air-conditioning ECU 7 transmits the idling stop allowing signal, which allows the engine to stop in response to an air-conditioning requirement, and the idling stop cancel signal, which allows the engine having been stopped in the idling stop control to restart in response to an air-conditioning requirement, to the vehicle ECU 6 and that the vehicle ECU 6 stops or restarts the engine in response to the signals. However, the idling stop control described later can be performed by the idling stop controller 10 configured by at least one of the vehicle ECU 6 and the air-conditioning ECU 7 similar to the above-described second embodiment.

Figure 7:
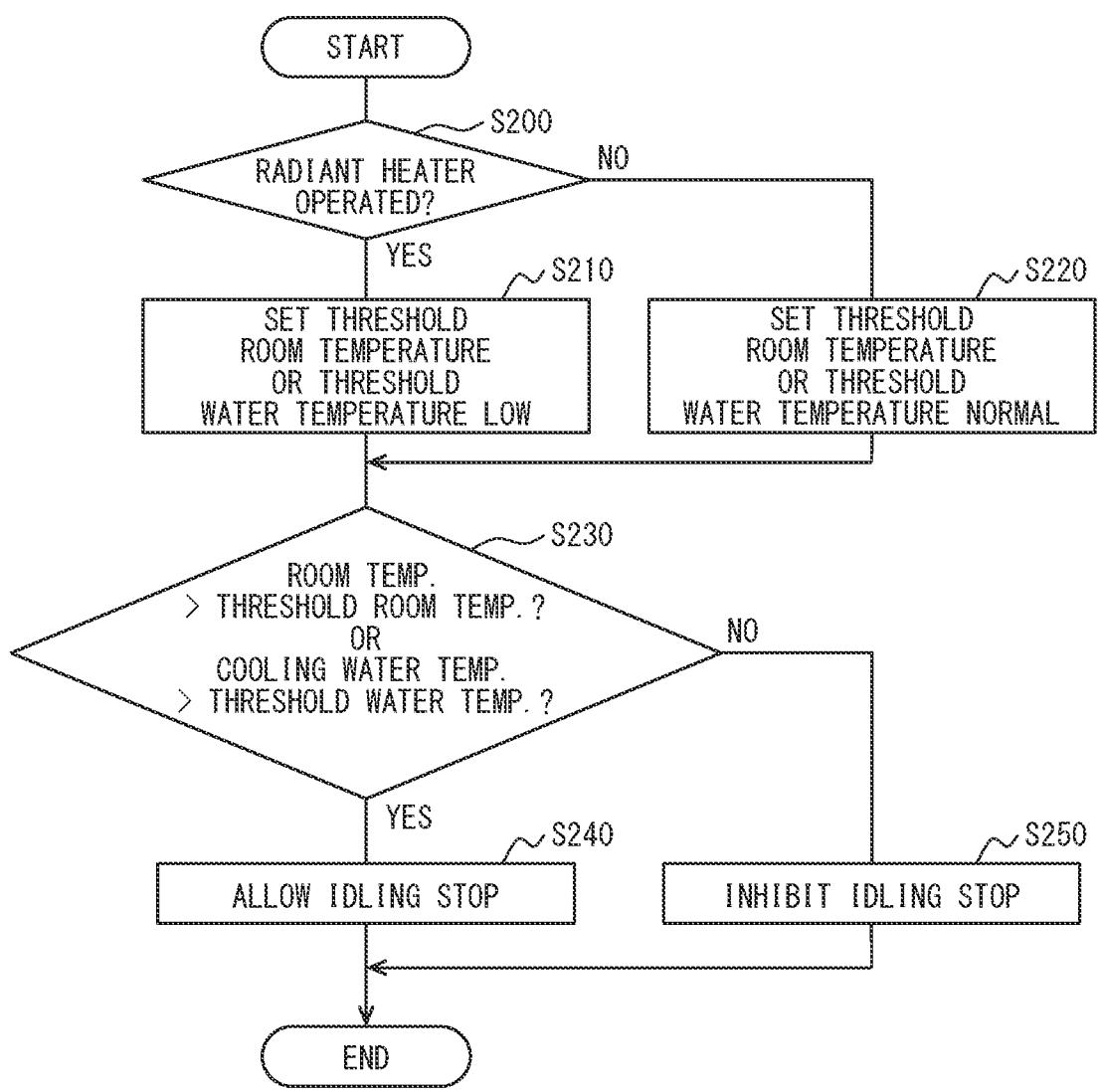
FIG. 7 is a flowchart of a control process, in the idling stop mode, of an air-conditioning control device of a vehicle control system according to a third embodiment.

The flowchart in FIG. 7 shows a control procedure performed by the air-conditioning ECU 7 when the vehicle ECU 6 stops the engine in response to the idling stop control. The control procedure may be performed at specified time intervals while the engine is operating or may be performed before the vehicle ECU 6 stops the engine in response to the idling stop control.

At step S200, the air-conditioning ECU 7 determines whether the radiant heater 4 is operating. When the air-conditioning ECU 7 determines that the radiant heater 4 is operating, the control procedure advances to step S210.

When the room temperature of the vehicle compartment is low, the sensory warmth applied to the occupant may deteriorate. However, the deterioration of the sensory warmth can be compensated by radiant heat from the radiant heater 4 while the radiant heater 4 is operating. When the air outlet temperature of the air conditioner 2 falls, the sensory warmth applied to the occupant may deteriorate. However, the deterioration of the sensory warmth can be compensated by radiant heat from the radiant heater 4 while the radiant heater 4 is operating. At step S210, the air-conditioning ECU 7 lowers the threshold room temperature of the room temperature of the vehicle to be a low threshold room temperature or lowers the threshold water temperature of the cooling water temperature to be a low threshold water temperature. The low threshold room temperature is lower than a normal threshold room temperature. The low threshold water temperature is lower than a normal threshold water temperature. For example, a room temperature and a cooling water temperature, at which the occupant does not feel a certain level of cold when the engine stops in the idling stop control with the radiant heater 4 being operated, are determined by experiments. The low threshold room temperature lower than the normal threshold room temperature and the low threshold water temperature lower than the normal threshold water temperature are set based on the room temperature and the cooling water temperature determined by the experiments and are stored in the air-conditioning ECU 7.

The control procedure advances to step S220 when the air-conditioning ECU 7, at step S200, determines that the radiant heater 4 is not operated.

At step S220, the air-conditioning ECU 7 sets the threshold room temperature of the room temperature or the threshold water temperature of the cooling water temperature, which is used to determine whether to allow the engine to stop in the idling stop control, to the normal threshold room temperature or the normal threshold water temperature. For example, a room temperature and a cooling water temperature, at which the occupant does not feel a certain level of cold when the engine stops in the idling stop control with the radiant heater 4 not being operated, are determined by experiments. The normal threshold room temperature and the normal threshold water temperature are set based on the room temperature and the cooling water temperature determined by the experiments and are stored in the air-conditioning ECU 7.

Subsequently, at step S230, the air-conditioning ECU 7 determines whether the room temperature of the vehicle compartment is higher than the threshold room temperature set at step S210 or at step S220, or determines whether the cooling water temperature is higher than the threshold water temperature set at step S210 or at step S220.

The air-conditioning ECU 7 transmits the idling stop allowing signal to the vehicle ECU 6 when the room temperature is higher than the threshold room temperature or when the cooling water temperature is higher than the threshold water temperature. In response to the idling stop allowing signal, the vehicle ECU 6 stops the engine when the vehicle speed is zero or substantially zero and other idling stop enabling conditions are met.

On the other hand, the air-conditioning ECU 7 transmits the idling stop prohibiting signal to the vehicle ECU 6 when the room temperature is lower than the threshold room temperature or when the cooling water temperature is lower than the threshold water temperature. In response to the idling stop prohibiting signal, the vehicle ECU 6 continues the engine to be operating even when the vehicle speed is zero or substantially zero and other idling stop enabling conditions are met.

In the above-described third embodiment, regarding the idling stop enabling condition for stopping the engine in response to the idling stop control, the air-conditioning ECU 7 sets the normal threshold room temperature or the normal threshold water temperature when the radiant heater 4 is not operated, and sets the low threshold room temperature lower than the normal threshold room temperature or the low threshold water temperature lower than the normal threshold water temperature when the radiant heater 4 is operated. The low threshold room temperature or the low threshold water temperature with the radiant heater 4 being operated is lower than the normal threshold room temperature or the normal threshold water temperature with the radiant heater 4 not being operated when comparing under the same condition with the same factors such as ambient temperature, a thermal load of the vehicle, and/or state of the engine, e.g., warm-up state of the engine. The air-conditioning ECU 7 may set the threshold room temperature or the threshold water temperature with or without reference to factors such as ambient temperature, a thermal load of the vehicle, or state of the engine, e.g., warm-up state of the engine. Since the idling stop mode can be performed in various idling stop enabling conditions, the air-conditioning ECU 7 can decrease the fuel consumption thereby reducing the volume of exhaust gas.

Fourth Embodiment

A fourth embodiment will be described hereafter. In the fourth embodiment and the following fifth to seventh embodiments, control procedures to stop the engine in the idling stop control in a case where the radiant heater 4 is not operated before the idling stop mode starts will be described.

Figure 8:
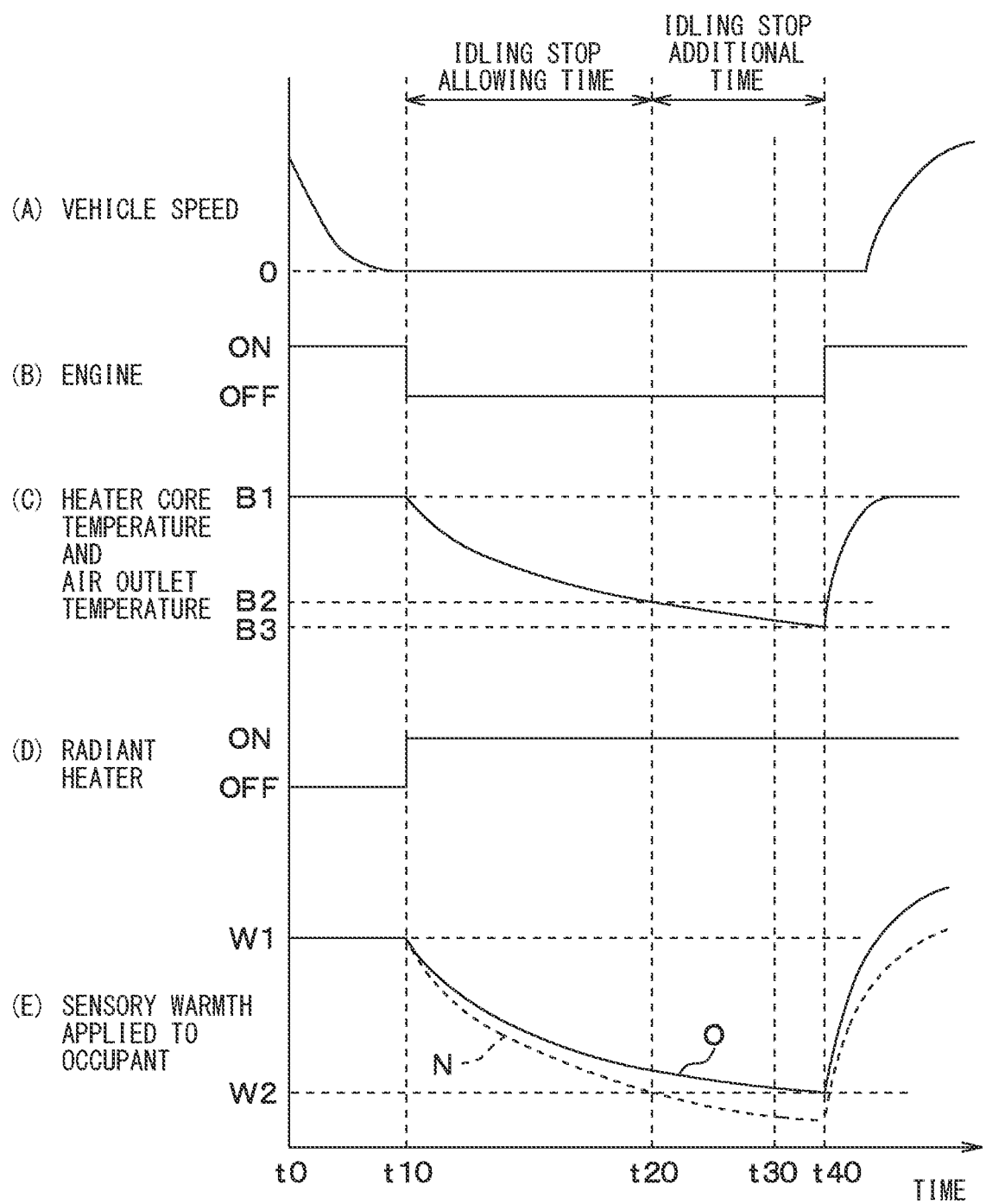
FIG. 8 is a flowchart of a vehicle control system in the idling stop mode according to a fourth embodiment.

The idling stop control by the vehicle controlling system 1 in the fourth embodiment will be described with reference to the time chart shown in FIG. 8.

When a vehicle speed becomes zero or almost zero during a time from time t0 to time t10 as shown in FIG. 8(A) and the specified idling stop enabling condition for stopping the engine in response to the idling stop control is met, the vehicle ECU 6 stops the engine by the idling stop control at time t10 as shown in FIG. 8(B).

As such, as shown in FIG. 8(C), a temperature of the heater core of the air conditioner 2 falls from the temperature B1 after time t10, and the air outlet temperature falls as the temperature of the heater core falls.

As shown in FIG. 8(D), the radiant heater 4 is not operated from time t0 to time t10 before the idling stop mode starts. At time t0, the radiant heater 4 starts operating in response to stopping the engine. When it is mentioned that the radiant heater 4 starts operating in response to stopping the engine, it may mean that the engine stops and the radiant heater 4 starts operating simultaneously or that the radiant heater 4 starts operating a specified time, e.g., a few micro seconds to a few seconds, after the engine stops.

In FIG. 8(E), solid line O shows the sensory warmth applied to the occupant when the radiant heater 4 starts in response to the stop of the engine. In FIG. 8(E), dashed line N shows the sensory warmth applied to the occupant in a case where the radiant heater 4 stops before the idling stop mode starts and has been stopped continually after the idling stop mode starts.

When the radiant heater 4 starts in response to stopping the engine, the occupant is warmed by radiant heat from the radiant heater 4. Therefore, after time t10, the sensory warmth, shown by solid line O, applied to the occupant deteriorates gradually as the air outlet temperature of the air conditioner 2 falls, however being still greater (or warmer) than the sensory warmth shown by dashed line N. As such, at time t40 a specified time after time t20, the sensory warmth, shown by solid line O, applied to the occupant becomes the sensory warmth W2 with which the occupant feels a certain level of cold.

When the radiant heater 4 starts in response to the engine stop, the air-conditioning ECU 7 sets the extended timer time. As described above, the extended timer time is set adding the additional timer time to the normal timer time. Specifically, the extended timer time is a total of idling stop allowing time and idling stop additional time in a time chart shown in FIG. 8. When the time becomes time t40, i.e., the extended timer time elapses, the air-conditioning ECU 7 transmits the idling stop cancel signal to the vehicle ECU 6. Then, as shown in FIG. 8(B), the vehicle ECU 6 restarts the engine at time t40.

When the engine restarts at time t40, the engine cooling water starts circulating in the air conditioner 2. As such, as shown in FIG. 8(C), a temperature of the heater core rises from a temperature B3 after time t40, and the air outlet temperature rises as the temperature of the heater core rises. Therefore, as shown by solid line O in FIG. 8(E), the sensory warmth applied to the occupant rises gradually from the sensory warmth W2 after time t40. Once the sensory warmth applied to the occupant rises, output of the radiant heater 4 may be allowed to decrease or the radiant heater 4 may be allowed to stop again.

As shown in FIG. 8(A), the vehicle starts moving and the vehicle speed increases when the gas pedal is operated after time 40.

Figure 9:
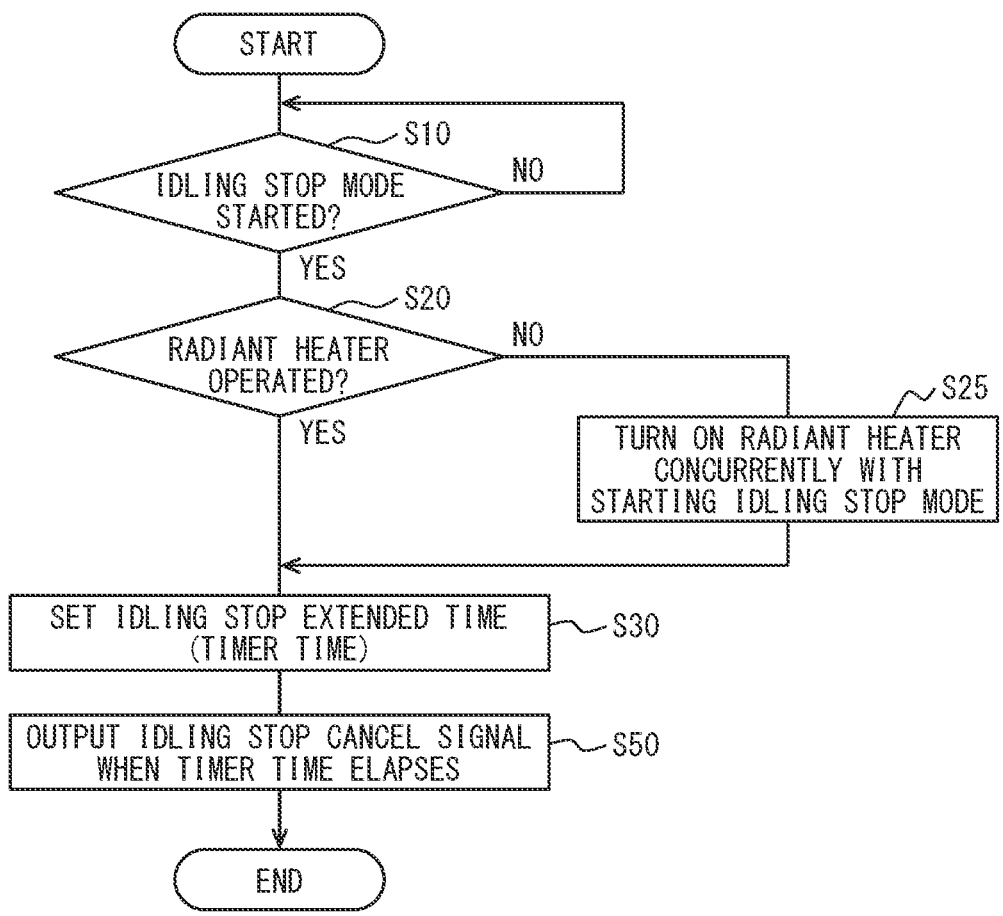
FIG. 9 is a flowchart of a control process, in the idling stop mode, of an air-conditioning control device of the vehicle control system according to the fourth embodiment.

A control procedure performed by the air-conditioning ECU 7 in the idling stop mode in the fourth embodiment will be described hereafter with reference to a flowchart shown in FIG. 9.

At step S10, the air-conditioning ECU 7 determines whether the vehicle ECU 6 stops the engine in the idling stop control. The control procedure advances to step S20 when the air-conditioning ECU 7 determines that the engine is stopped in response to the idling stop control.

At step S20, the air-conditioning ECU 7 determines whether the radiant heater 4 is operating. The control procedure advances to step S25 when the air-conditioning ECU 7 determines that the radiant heater 4 is not operated when the engine is stopped in the idling stop control.

At step S25, the air-conditioning ECU 7 outputs an automatic operation signal to the heater ECU 8 so that the radiant heater 4 starts operating in response to stopping the engine in idling stop control. The heater ECU 8 starts the radiant heater 4 when receiving the automatic operation signal. Additionally or alternatively, the air-conditioning ECU 7 may transmit the automatic operation signal directly to the radiant heater 4 to start the radiant heater 4.

The air-conditioning ECU 7 advances the control procedure from step S25 to step S30.

When the air-conditioning ECU 7, at step S20, determines that the radiant heater 4 is operating, the control procedure advances to step S30.

At step S30, the air-conditioning ECU 7 sets the extended timer time as the stop time during which the engine is allowed to be stopped continuously in response to the idling stop control.

When the extended timer time set at step S30 elapses, the air-conditioning ECU 7 transmits the idling stop cancel signal to the vehicle ECU 6 at step S50.

In the above-described fourth embodiment, the air-conditioning ECU 7 outputs the automatic operation signal, which allows the radiant heater 4 to start in response to stopping the engine, when the engine stops in response to the idling stop control with the radiant heater 4 not being operated.

As such, even when the air outlet temperature of the air conditioner 2 falls in the idling stop mode, the sensory warmth applied to the occupant can be maintained in a manner that the air-conditioning ECU 7 operates the radiant heater 4 automatically. As a result, the air-conditioning ECU 7 can extend the time duration during which the idling stop mode is performed.

Fifth Embodiment

Figure 10:
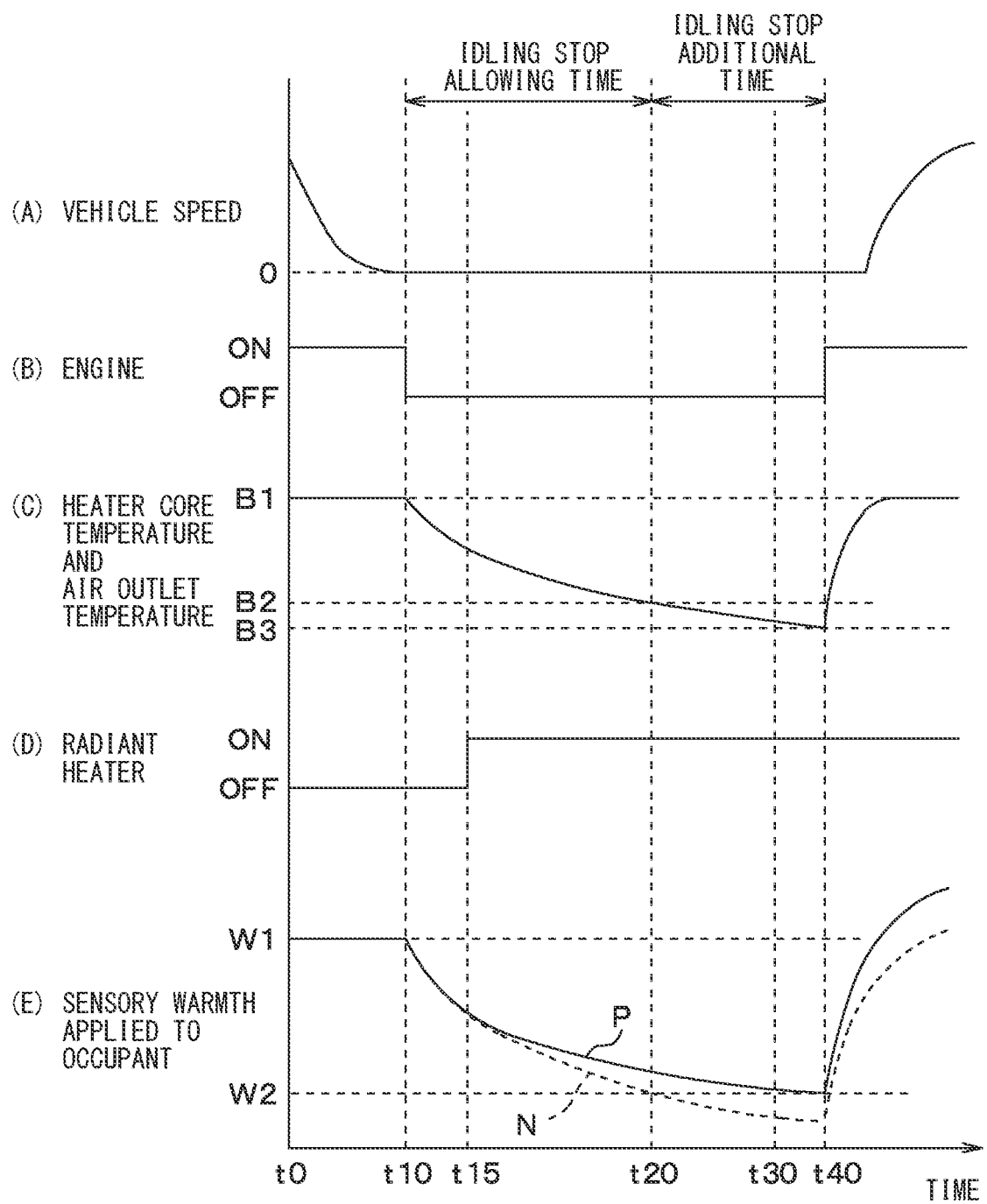
FIG. 10 is a flowchart of a vehicle control system in the idling stop mode according to a fifth embodiment.

A fifth embodiment will be described hereafter. The idling stop control by the vehicle controlling system 1 in the fifth embodiment will be described with reference to the time chart shown in FIG. 10.

When a vehicle speed becomes zero or almost zero during a time from time t0 to time t10 as shown in FIG. 10(A) and the specified idling stop enabling condition for stopping the engine in response to the idling stop control is met, the vehicle ECU 6 stops the engine by the idling stop control at time t10 as shown in FIG. 10(B).

As such, as shown in FIG. 10(C), a temperature of the heater core of the air conditioner 2 falls from the temperature B1 after time t10, and the air outlet temperature falls as the temperature of the heater core falls.

As shown in FIG. 10(D), the radiant heater 4 is not operated from time t0 before the idling stop mode starts to time t15 after the idling stop mode starts. The radiant heater 4 starts operating at time t15, i.e., a specified time after the engine stops at time t10 in the idling stop control. For example, the temperature of the heater core and the air outlet temperature fall and become specified temperature a specified time after stopping the engine. This specified time may be measured by experiments and is used as the above specified time to start the radiant heater 4. The specified time to start the radiant heater 4 is stored in the air-conditioning ECU 7.

In FIG. 10(E), solid line P shows the sensory warmth applied to the occupant in a case where the radiant heater 4 starts a specified time after the engine stops. In FIG. 10(E), dashed line N shows the sensory warmth applied to the occupant in a case where the radiant heater 4 stops before the idling stop mode starts and has been stopped continually after the idling stop mode starts.

When the radiant heater 4 starts operating at time t15, i.e., the specified time after the engine stops, the occupant is warmed by radiant heat from the radiant heater 4 after time t15. Therefore, after time t10, the sensory warmth, shown by solid line P, applied to the occupant deteriorates gradually as the air outlet temperature of the air conditioner 2 falls, however being still greater (or warmer) than the sensory warmth shown by dashed line N. As such, at time t40 a specified time after time t20, the sensory warmth, shown by solid line P, applied to the occupant becomes the sensory warmth W2 with which the occupant feels a certain level of cold.

The air-conditioning ECU 7 sets the extended timer time in a case where the radiant heater 4 after a specified time after the engine stops. When the time becomes time t40, i.e., the additional timer time elapses, the air-conditioning ECU 7 transmits the idling stop cancel signal to the vehicle ECU 6. Then, as shown in FIG. 10(B), the vehicle ECU 6 restarts the engine at time 40.

Figure 11:
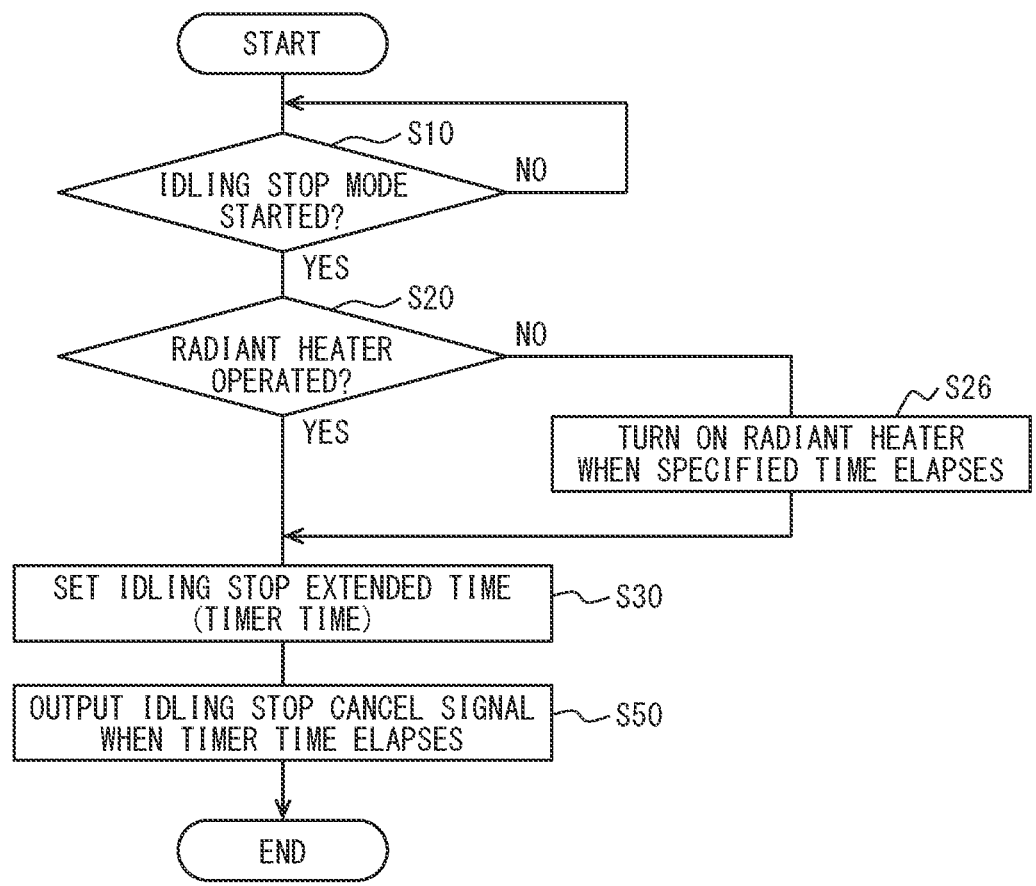
FIG. 11 is a flowchart of a control process, in the idling stop mode, of an air-conditioning control device of the vehicle control system according to the fifth embodiment.

A control procedure performed by the air-conditioning ECU 7 in the idling stop mode in the fifth embodiment will be described hereafter with reference to a flowchart shown in FIG. 11.

At step S10, the air-conditioning ECU 7 determines whether the vehicle ECU 6 stops the engine in the idling stop control. The control procedure advances to step S20 when the air-conditioning ECU 7 determines that the engine is stopped in response to the idling stop control.

At step S20, the air-conditioning ECU 7 determines whether the radiant heater 4 is operating. The control procedure advances to step S26 when the air-conditioning ECU 7 determines that the radiant heater 4 is not operated when the engine is stopped in the idling stop control.

At step S26, the air-conditioning ECU 7 outputs the automatic operation signal to the heater ECU 8 so that the radiant heater 4 starts operating the specified time after the engine stops in response to the idling stop control. The heater ECU 8 starts the radiant heater 4 when receiving the automatic operation signal. Additionally or alternatively, the air-conditioning ECU 7 may transmit the automatic operation signal directly to the radiant heater 4 to start the radiant heater 4.

The air-conditioning ECU 7 advances the control procedure from step S26 to step S30.

When the air-conditioning ECU 7, at step S20, determines that the radiant heater 4 is operating, the control procedure advances to step S30.

At step S30, the air-conditioning ECU 7 sets the extended timer time as the stop time during which the engine is allowed to be stopped continuously in response to the idling stop control.

When the extended timer time set at step S30 elapses, the air-conditioning ECU 7 transmits the idling stop cancel signal to the vehicle ECU 6 at step S50.

In the above-described fifth embodiment, the air-conditioning ECU 7 outputs the automatic operation signal, which allows the radiant heater 4 to start operating the specified time after the engine stops in the idling stop control, when the engine stops in response to the idling stop control with the radiant heater 4 not being operated.

As such, while the temperature of the heater core is high immediately after the engine stops, the vehicle consumes less electric power by stopping the radiant heater 4.

Sixth Embodiment

A sixth embodiment will be described hereafter.

Figure 12:
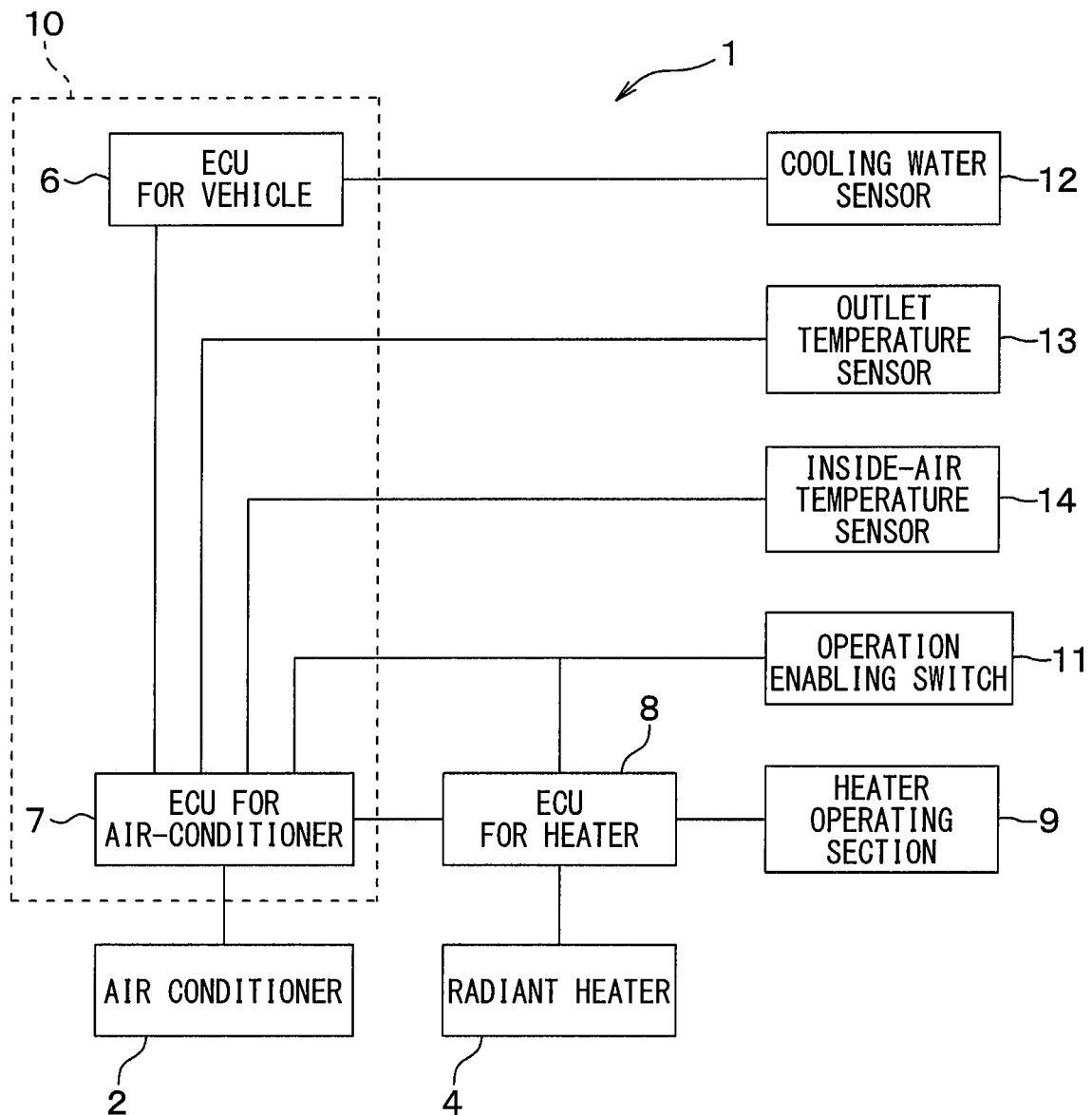
FIG. 12 is a diagram showing a vehicle control system according to a sixth embodiment.

As shown in FIG. 12, the vehicle control system 1 in the sixth embodiment includes an operation enabling switch 11 that is operated by the occupant. The occupant, using the operation enabling switch 11, can select whether to allow the radiant heater 4 to start operating in response to the automatic operation signal from the air-conditioning ECU 7 as in the above-described fourth and fifth embodiments. An operation signal from the operation enabling switch 11 is input to the air-conditioning ECU 7 or the heater ECU 8. Additionally or alternatively, the operation signal from the operation enabling switch 11 may be input to the radiant heater 4 directly. The operation enabling switch 11 may be coupled integrally with the heater control member 9.

Figure 13:
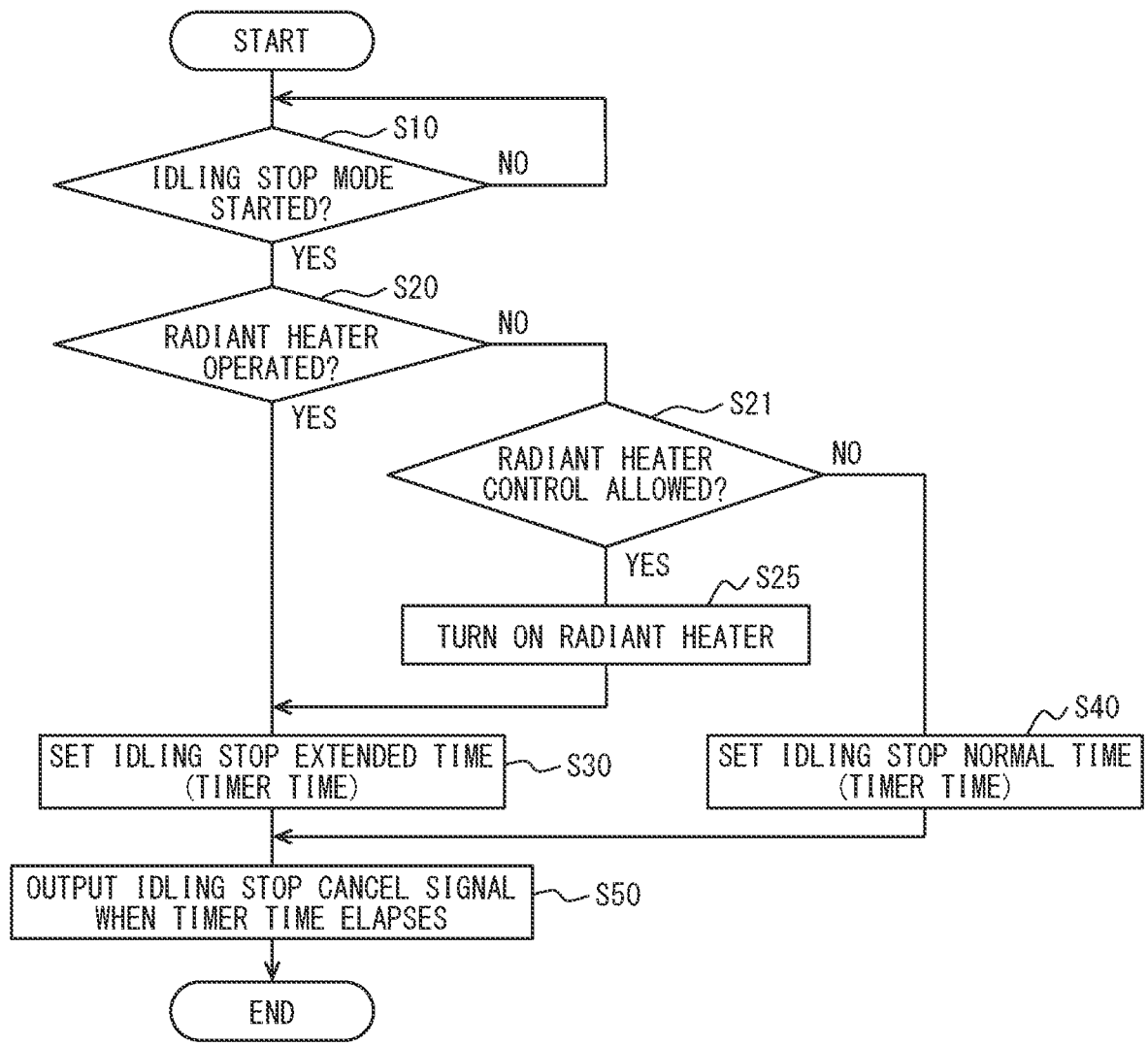
FIG. 13 is a flowchart of a control process, in the idling stop mode, of an air-conditioning control device of the vehicle control system according to the sixth embodiment.

A control procedure performed by the air-conditioning ECU 7 in the idling stop mode in the sixth embodiment will be described hereafter with reference to a flowchart shown in FIG. 13.

At step S10, the air-conditioning ECU 7 determines whether the vehicle ECU 6 stops the engine in the idling stop control. The control procedure advances to step S20 when the air-conditioning ECU 7 determines that the engine is stopped in response to the idling stop control.

At step S20, the air-conditioning ECU 7 determines whether the radiant heater 4 is operating. The control procedure advances to step S21 when the air-conditioning ECU 7 determines that the radiant heater 4 is not operated when the engine is stopped in the idling stop control.

At step S21, the air-conditioning ECU 7 detects the operation signal from the operation enabling switch 11 operated by the occupant. That is, the air-conditioning ECU 7 determines whether the radiant heater 4 is allowed by the operation enabling switch 11 to start operating automatically in response to the automatic operation signal.

The air-conditioning ECU 7 advances the control procedure to step S40 when determining that the radiant heater 4 is not allowed to start operating automatically. At step S40, the air-conditioning ECU 7 sets the normal timer time as the stop time during which the engine is allowed to be stopped continuously in response to the idling stop control. Subsequently, the control procedure advances to step S50.

On the other hand, the air-conditioning ECU 7 advances the control procedure to step S25 when determining that the radiant heater 4 is allowed to start operating automatically in response to the operation signal from the operation enabling switch 11.

At step S25, the air-conditioning ECU 7 outputs an automatic operation signal to the heater ECU 8 so that the radiant heater 4 starts operating in response to stopping the engine in idling stop control. The heater ECU 8 starts the radiant heater 4 when receiving the automatic operation signal. Additionally or alternatively, the air-conditioning ECU 7 may transmit the automatic operation signal directly to the radiant heater 4 to start the radiant heater 4.

The air-conditioning ECU 7 advances the control procedure from step S25 to step S30.

At step S30, the air-conditioning ECU 7 sets the extended timer time as the stop time during which the engine is allowed to be stopped continuously in response to the idling stop control.

When the extended timer time set at step S30 or the normal timer time set at step S40 elapses, the air-conditioning ECU 7 transmits the idling stop cancel signal to the vehicle ECU 6 at step S50.

In the above-described sixth embodiment, the air-conditioning ECU 7 starts the radiant heater 4 when the engine stops in the idling stop control with the radiant heater 4 not being operated and the radiant heater 4 is allowed to start operating by the operation enabling switch 11. On the other hand, the air-conditioning ECU 7 does not start the radiant heater 4 when the engine stops in the idling stop control with the radiant heater 4 not being operated and the radiant heater 4 is not allowed to start operating by the operation enabling switch 11.

As such, the occupant, using the operation enabling switch 11, can determine whether to start the radiant heater 4 automatically in the idling stop mode.

Seventh Embodiment

A seventh embodiment will be described hereafter.

Figure 14:
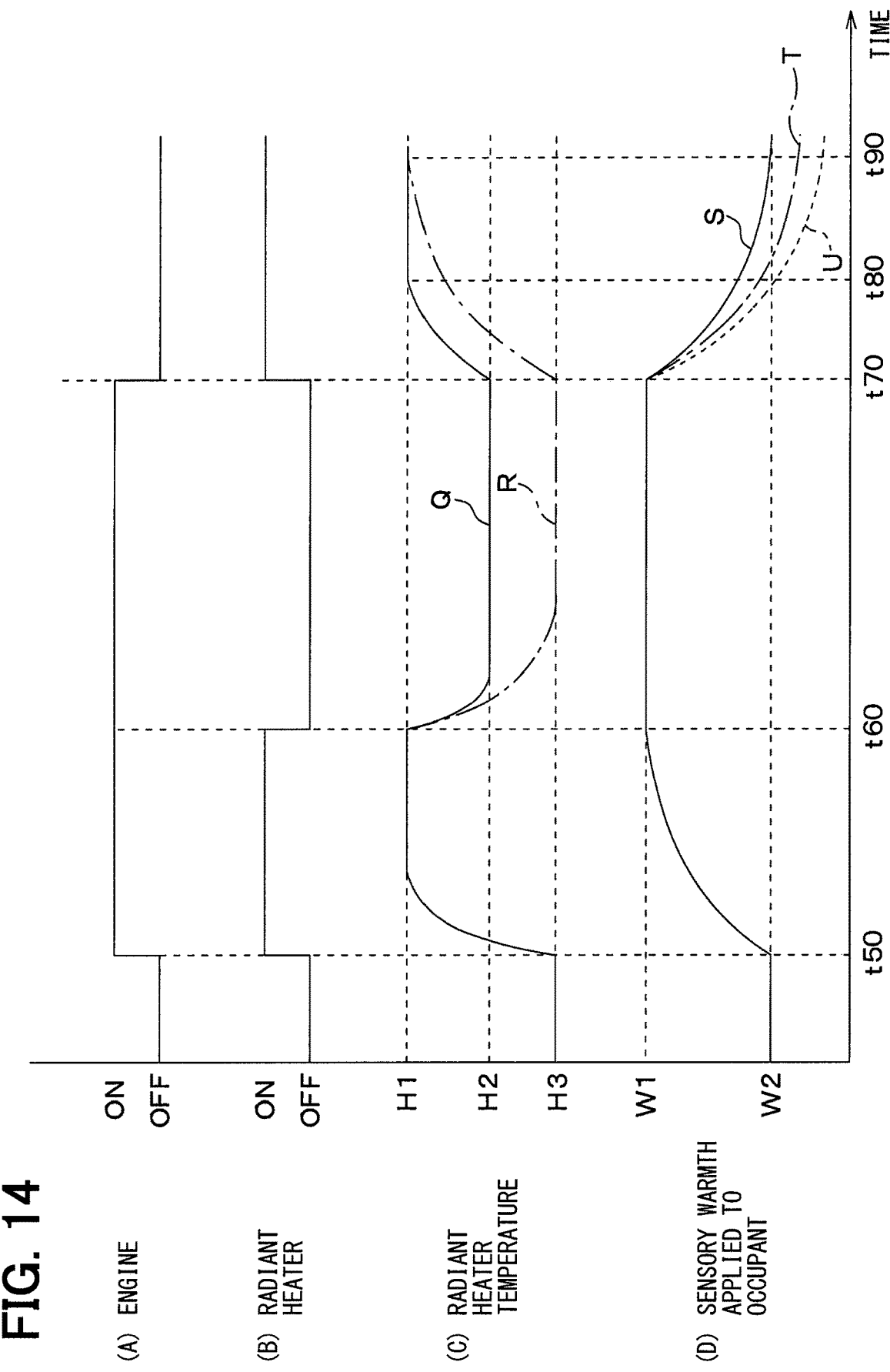
FIG. 14 is a flowchart of a vehicle control system in the idling stop mode according to a seventh embodiment.

FIG. 14 is a time chart as to how the vehicle control system 1 controls the vehicle in the seventh embodiment.

As shown in FIG. 14(A), the vehicle ECU 6 restarts the engine at time t50. The engine is operated continuously after time t50. When the vehicle speed becomes zero or substantially zero and the idling stop enabling conditions to stop the engine in the idling stop control are met, the vehicle ECU 6 stops the engine in response to the idling stop control at time t70.

The temperature of the heater core and the air outlet temperature rise gradually after the engine starts at time t50 and fall gradually after the engine stops at time t70 (this change in the temperature is not shown in FIG. 14).

As shown in FIG. 14(B), the engine starts and the radiant heater 4 starts simultaneously at time t50. The radiant heater 4 can increase a surface temperature thereof rapidly thereby supplying radiant heat to the occupant to increase the sensory warmth applied to the occupant, even when a temperature of the engine cooling water is low immediately after the engine starts.

When the occupant operates the heater operation switch to stop the radiant heater 4 at time t60 while the engine is operated, the air-conditioning ECU 7 or the heater ECU 8 supplies power to the radiant heater 4 to maintain a surface temperature of the radiant heater 4 within a specified temperature range. Here, the specified temperature range may is a range in which almost no sensory warmth is applied to the occupant by radiant heat from the radiant heater 4. Specifically, the surface temperature of the radiant heater 4 is kept, e.g., at about 50° C.

Alternatively, in a case where the heater operation switch is not operated by the occupant at time t60, the air-conditioning ECU 7 may transmit a surface-temperature switching signal to the heater ECU 8 to maintain the surface temperature of the radiant heater 4 within the specified temperature range when the specified time elapses from starting the engine.

Alternatively, in the case where the heater operation switch is not operated by the occupant at time t60, the air-conditioning ECU 7 may transmit the surface-temperature switching signal to the heater ECU 8 when determining that the cooling water temperature, the temperature of the heater core, or the air outlet temperature rises sufficiently after starting the engine.

When the vehicle ECU 6 stops the engine in the idling stop control at time t70, the air-conditioning ECU 7 outputs the automatic operation signal to the heater ECU 8 and starts the radiant heater 4 so that the surface temperature of the radiant heater 4 becomes hot enough to warm the occupant. In response to the automatic operation signal, the heater ECU 8 increases the surface temperature of the radiant heater 4. Additionally or alternatively, the air-conditioning ECU 7 may transmit the automatic operation signal directly to the radiant heater 4 to increase the surface temperature of the radiant heater 4.

As shown by solid line Q in FIG. 14(C), a temperature of the radiant heater 4 before the engine starts is a temperature H3, which is a temperature at the time of stopping a supply of power. The temperature of the radiant heater 4 rises rapidly from time t50 and becomes a temperature H1 with which the sensory warmth is applied to the occupant sufficiently. When the radiant heater 4 is stopped by a heater operation switch at time t60 while the engine is operating, the temperature of the radiant heater 4 is maintained at a temperature H2 with which the sensory warmth is not applied to the occupant. Subsequently, when the engine stops at time t70, the surface temperature of the radiant heater 4 rises in response to an automatic operation signal output from the air-conditioning ECU 7. At time t80, the temperature of the radiant heater 4 becomes the temperature H1 with which the sensory warmth is applied to the occupant.

In FIG. 14(C), one-dot chain line R shows a temperature of the radiant heater 4 when a power supply to the radiant heater 4 is stopped at time t60. The temperature of the radiant heater 4 falls to a temperature H3, which is a temperature with no power supply to the radiant heater 4. As such, when the radiant heater 4 starts in response to the automatic operation signal output from the air-conditioning ECU 7 at time t70, the temperature of the radiant heater 4 rises and becomes the temperature H1, with which the sensory warmth is applied to the occupant, at time t90 a specified time after time t80.

That is, in a case where the temperature of the radiant heater 4 is maintained at the temperature H2, with which the sensory warmth is not applied to the occupant, before the engine stops in response to the idling stop control, a time duration required to raise the temperature of the radiant heater 4 to the temperature H1, with which the sensory warmth is applied to the occupant, after the engine stops becomes short.

In a case where the temperature of the radiant heater 4 falls to the temperature H3, which is the temperature with no power supply, before the engine stops in the idling stop control, a time required to increase the temperature of the radiant heater 4 to the temperature H1 after stopping the engine becomes long.

As shown in FIG. 14(D), the sensory warmth applied to the occupant increases gradually after the engine starts at time t50. At time t60, the sensory warmth becomes the sensory warmth W1 with which the occupant feels warm sufficiently. After time 60, the temperature of the heater core of the air conditioner 2 and the air outlet temperature of the air conditioner 2 is still high enough to maintain the sensory warmth at the sensory warmth W1 with which the occupant feels warm sufficiently even when the sensory warmth is not applied by the radiant heater 4.

Relating to the sensory warmth applied to the occupant after time t70 in FIG. 14(D), solid line S shows the sensory warmth applied to the occupant in a case where the temperature 4 has been maintained at the temperature H2, with which the sensory warmth is not applied to the occupant, before the engine stops in response to the idling stop control. As shown by solid line S, the sensory warmth applied to the occupant is sensory warmth W1 before the engine stops, and deteriorates from the sensory warmth W1 as the air outlet temperature of the air conditioner 2 falls. At time t90 a specified time after time t80, the sensory warmth deteriorates to sensory warmth W2 with which the occupant feels a certain level of cold.

In contrast, one-dot chain line T in FIG. 14(D) shows the sensory warmth applied to the occupant in a case where the temperature of the radiant heater 4 falls to the temperature H3, which is the temperature at the time of stopping a supply of power, before the engine stops in response to the idling stop control. As shown by one-dot chain line T, the sensory warmth applied to the occupant deteriorates to the sensory warmth W2, with which the occupant feels a certain level of cold, before time t90.

In FIG. 14(D), dashed line U shows the sensory warmth applied to the occupant in a case where the radiant heater 4 is stopped after time t70. As shown by dashed line U, the sensory warmth applied to the occupant deteriorates to the sensory warmth W2, with which the occupant feels a certain level of cold, before time t80.

In the above-described seventh embodiment, the air-conditioning ECU 7 supplies power to the radiant heater 4 so that the surface temperature of the radiant heater 4 is maintained with in the specified temperature range even when the radiant heater 4 is stopped while the engine is operating.

As such, a time to increase the surface temperature of the radiant heater 4 to a required temperature can be shortened when the radiant heater 4 starts operating automatically in the idling stop mode.

Eighth Embodiment

Figure 15:
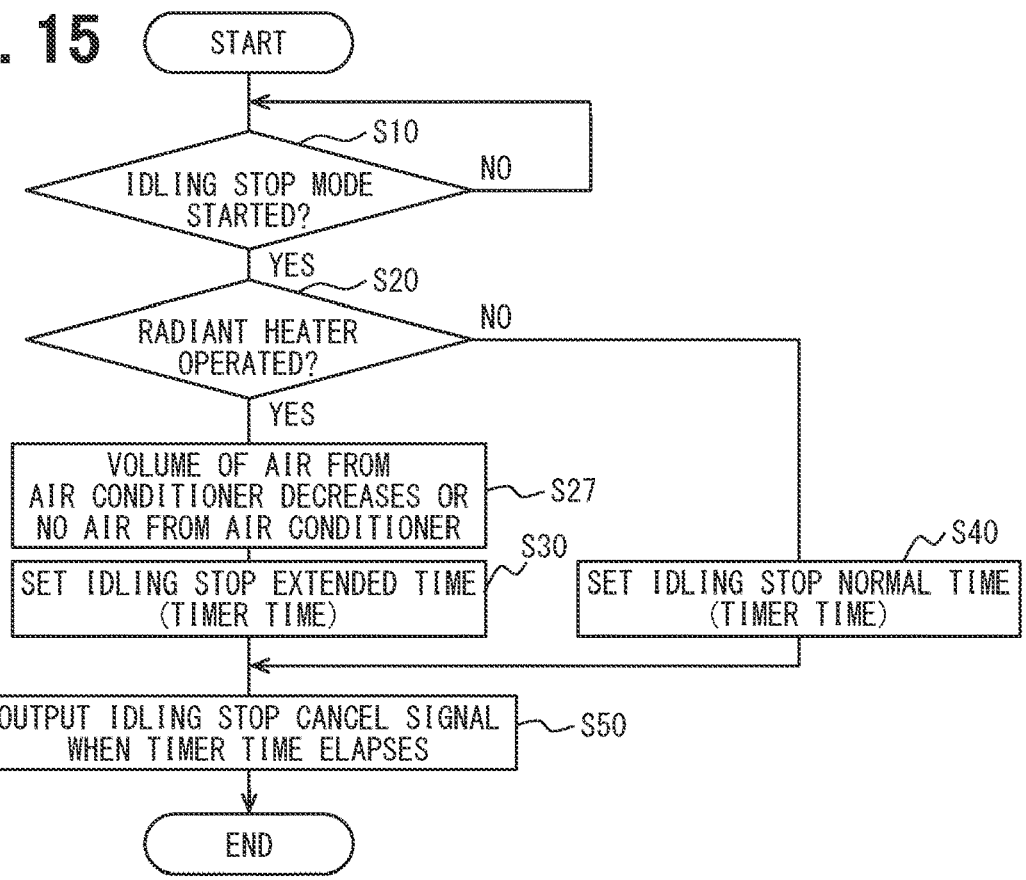
FIG. 15 is a flowchart of a control process, in the idling stop mode, of an air-conditioning control device of a vehicle control system according to an eighth embodiment.

An eighth embodiment will be described hereafter. The flowchart in FIG. 15 shows a control procedure performed by the air-conditioning ECU 7 in the idling stop mode in the eighth embodiment.

At step S10, the air-conditioning ECU 7 determines whether the vehicle ECU 6 stops the engine in the idling stop control. The control procedure advances to step S20 when the air-conditioning ECU 7 determines that the engine is stopped in response to the idling stop control.

At step S20, the air-conditioning ECU 7 determines whether the radiant heater 4 is operating. The control procedure advances to step S27 when the air-conditioning ECU 7 determines that the engine stops in the idling stop control while the radiant heater 4 is operating.

At step S27, the air-conditioning ECU 7 stops an air supply from the FOOT outlet of the air conditioner 2 or decreases a volume of air flowing out of the FOOT outlet. This processing may be performed with stopping the engine in the 30 idling stop control simultaneously or may be performed a specified time after stopping the engine. The specified time is from a time at which the engine stops to a time at which the temperature of the heater core configuring the air conditioner 2 or the air outlet temperature falls under a specified temperature and may be measured by experiments. The specified time is stored in the air-conditioning ECU 7.

Alternatively, the air-conditioning ECU 7 stops an air supply from the FOOT outlet of the air conditioner 2 or decreases a volume of air flowing out of the FOOT outlet when the temperature of the heater core configuring the air conditioner 2 or the air outlet temperature becomes the specified temperature or lower or when a degree of a decrease in the temperature of the heater core or in the air outlet temperature is a specified degree or greater.

The air-conditioning ECU 7 advances the control procedure from step S27 to step S30.

At step S30, the air-conditioning ECU 7 sets the extended timer time as the stop time during which the engine is allowed to be stopped continuously in response to the idling stop control.

The control procedure advances to step S40 when the air-conditioning ECU 7, at step S20, determines that the radiant heater 4 is stopped.

At step s40, the air-conditioning ECU 7 sets the normal timer time as the stop during which the engine is allowed to be stopped continuously in response to the idling stop control.

When the extended timer time set at step S30 or the normal timer time set at step S40 elapses, the air-conditioning ECU 7 transmits the idling stop cancel signal to the vehicle ECU 6 at step S50.

In the above-described eighth embodiment, the air-conditioning ECU 7 stops an air supply from the FOOT outlet of the air conditioner 2 or decreases a volume of air flowing out of the FOOT outlet when the engine is stopped in the idling stop control and the radiant heater 4 is operated.

As such, a cause of a convection flow around foot of the occupant is suppressed. As a result, the radiant heater 4 can heat the lower legs 3 effectively. Thus, the air-conditioning ECU 7 can extend the time duration, during which the idling stop mode is operating, while suppressing the deterioration of the sensory warmth applied to the occupant in the idling stop mode.

Ninth Embodiment

Figure 16:
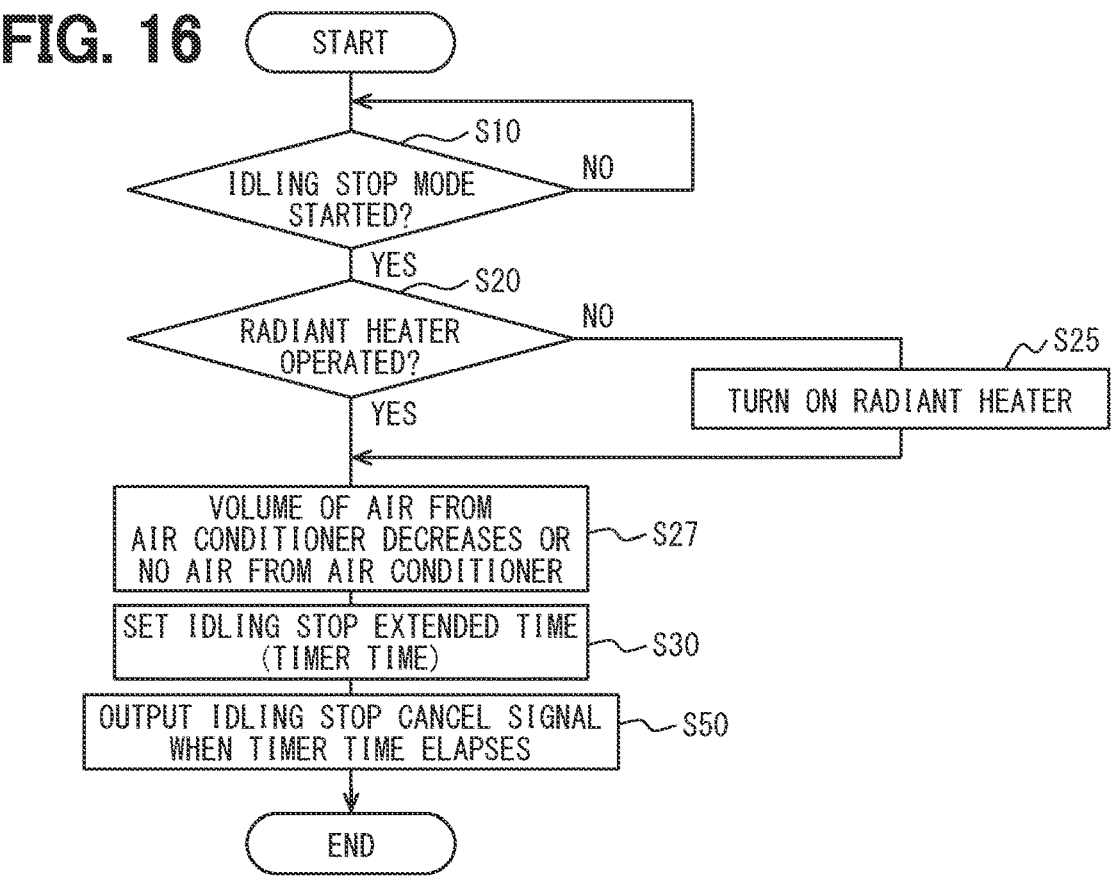
FIG. 16 is a flowchart of a control process, in the idling stop mode, of an air-conditioning control device of a vehicle control system according to a ninth embodiment.

A ninth embodiment will be described hereafter. The flowchart in FIG. 16 shows a control procedure performed by the air-conditioning ECU 7 in the idling stop mode in the ninth embodiment.

At step S10, the air-conditioning ECU 7 determines whether the vehicle ECU 6 stops the engine in the idling stop control. The control procedure advances to step S20 when the air-conditioning ECU 7 determines that the engine is stopped in response to the idling stop control.

At step S20, the air-conditioning ECU 7 determines whether the radiant heater 4 is operating. The control procedure advances to step S27 when the air-conditioning ECU 7 determines that the engine stops in the idling stop control while the radiant heater 4 is operating.

The control procedure advances to step S25 when the air-conditioning ECU 7 determines that the engine stops in the idling stop control while the radiant heater 4 is not operating.

At step S25, the air-conditioning ECU 7 outputs an automatic operation signal to the heater ECU 8 so that the radiant heater 4 starts operating in response to stopping the engine in idling stop control. The heater ECU 8 starts the radiant heater 4 when receiving the automatic operation signal. Additionally or alternatively, the air-conditioning ECU 7 may transmit the automatic operation signal directly to the radiant heater 4 to start the radiant heater 4.

The air-conditioning ECU 7 advances the control procedure from step S25 to step S27.

At step S27, the air-conditioning ECU 7 stops an air supply from the FOOT outlet of the air conditioner 2 or decreases a volume of air flowing out of the FOOT outlet.

The air-conditioning ECU 7 advances the control procedure from step S27 to step S30.

At step S30, the air-conditioning ECU 7 sets the extended timer time as the stop time during which the engine is allowed to be stopped continuously in response to the idling stop control.

When the extended timer time set at step S30 elapses, the air-conditioning ECU 7 transmits the idling stop cancel signal to the vehicle ECU 6 at step S50.

The above-described ninth embodiment can provide the same effects as the eighth embodiment.

Other Embodiments

The present disclosure is not limited to the above-described embodiments and can be modified as needed.

(1) In the above-described embodiments, the air-conditioning ECU 7 transmits the idling stop allowing signal and the idling stop cancel signal to the vehicle ECU 6. However, as an example modification, the idling stop control may be performed at least one of the vehicle ECU 6 and the air-conditioning ECU 7.

(2) In the above-described embodiments, the air-conditioning ECU 7 outputs the automatic operation signal to the heater ECU 8 to start the radiant heater 4. However, as an example modification, the radiant heater 4 may be operated by at least one of the air-conditioning ECU 7 and the heater ECU 8.

(3) The above-described embodiments are not unrelated to each other and can be combined as needed except when the combination is not appropriate obviously. Individual elements or features of a particular embodiment are not necessarily essential unless it is specifically stated that the elements or the features are essential in the foregoing description, or unless the elements or the features are obviously essential in principle.

CONCLUSION

A first aspect is described with at least a part of the above-described embodiments. In the first aspect, the air-conditioning control device is configured to control an air conditioner for a vehicle having a radiant heater. The radiant heater is supplied with power to heat an occupant in a vehicle compartment of the vehicle. The air conditioner is configured to heat an interior of the vehicle compartment using cooling water for an engine. The air-conditioning control device sends a cancel signal that allows the engine, which has been stopped in response to an idling stop control, to restart. The air-conditioning control device extends a stop time from stopping the engine in response to the idling stop control to outputting the cancel signal, which allows the engine having been stopped in the idling stop control to restart, to be longer with the radiant heater being operated than with the radiant heater not being operated.

In a second aspect, the air-conditioning control device outputs a cancel signal, which allows the engine to restart, when a specified timer time elapses from a time at which the engine stops in response to the idling stop control. The air-conditioning control device sets the timer time with the radiant heater 4 being operated to be longer than the timer time with the radiant heater 4 not being operated.

As such, a time elapsed from starting the idling stop mode is measured using a timer, a range of decrease in the air outlet temperature of the air conditioner is estimated, and then the sensory warmth applied to the occupant can be estimated. Therefore, a circuit in the air-conditioning control device can be simplified.

In a third aspect, the air conditioner includes a heater core and is configured to discharge air into the vehicle compartment. The air-conditioning control device outputs the cancel signal, which allows the engine being stopped in response to the idling stop control, when the temperature of the heater or the air outlet temperature, which is a temperature of the air discharged from the air conditioner, becomes a specified threshold temperature or lower. The air-conditioning control device sets the specified threshold temperature to be lower with the radiant heater being operated than with the radiant heater not being operated.

Thus, the sensory warmth applied to the occupant can be estimated based on the air outlet temperature of the air conditioner during the idling stop mode. As such, the air-conditioning control device can apply a more comfortable feeling to the occupant by controlling the temperature accurately.

In a fourth aspect, the air conditioner includes a heater core and is configured to discharge air into the vehicle compartment. The air-conditioning control device outputs the cancel signal when a temperature of the heater core or an air outlet temperature, which is a temperature of the air discharged from the air conditioner, at a time of stopping the engine falls by a specified threshold temperature difference or greater. The air-conditioning control device sets the specified threshold temperature difference to be greater with the radiant heater being operated than with the radiant heater not being operated.

Thus, the sensory warmth applied to the occupant can be estimated based on the range of decrease in the air outlet temperature of the air conditioner during the idling stop mode. As such, the air-conditioning control device can apply a more comfortable feeling to the occupant by controlling the temperature accurately.

In a fifth aspect, the air-conditioning control device outputs the automatic operation signal, which allows the radiant heater to start in response to stopping the engine, when the engine stops in response to the idling stop control with the radiant heater not being operated.

As such, the air-conditioner control device operates the radiant heater when the air outlet temperature of the air conditioner falls in the idling stop mode. Therefore, the sensory warmth is securely applied to the occupant. As a result, the air-conditioner control device can extend the time duration during which the idling stop mode is performed.

In a sixth aspect, the air-conditioning control device outputs the automatic operation signal, which allows the radiant heater to start after the specified time elapses after stopping the engine, when the engine stops in response to the idling stop control with the radiant heater not being operated.

As such, while the temperature of the heater core is high immediately after the engine stops, the vehicle consumes less electric power by stopping the radiant heater.

In a seventh aspect, the vehicle has the operation enabling switch which is operated by the occupant to set whether to allow the radiant heater to start in response to the automatic operation signal from the air-conditioning control device. The air-conditioning control device starts the radiant heater by the automatic operation signal when the engine stops in the idling stop control while the radiant heater is not operating and the radiant heater is allowed to be started by the operation enabling switch. On the other hand, the air-conditioning control device does not start the radiant heater when the engine stops in the idling stop control with the radiant heater not being operated and the radiant heater is not allowed to start operating by the operation enabling switch.

As such, the occupant, using the operation enabling switch, can set whether to start the radiant heater automatically in the idling stop mode.

In an eighth aspect, the air-conditioning control device supplies power to the radiant heater to maintain the surface temperature of the radiant heater within the specified temperature range when the radiant heater stops heating the occupant using radiant heat while the engine is operating.

As such, a time to increase the surface temperature of the radiant heater to a required temperature can be shortened when the radiant heater starts operating automatically in the idling stop mode.

In a ninth aspect, the air-conditioning control device stops an air supply to the lower legs of the occupant or reduces a volume of air flowing toward the lower legs when the engine is stopped in the idling stop control and the radiant heater is operating.

As such, a cause of a convection flow around foot of the occupant is suppressed. As a result, the radiant heater can heat the lower legs effectively.

In a tenth aspect, the air-conditioning control device sets the idling stop enabling conditions so that the engine is allowed to be stooped when the room temperature of the vehicle compartment is higher than the threshold room temperature or when the cooling water temperature is higher than the threshold water temperature. That is, regarding the idling stop enabling conditions for stopping the engine in response to the idling stop control, the air-conditioning control device is configured to set the threshold room temperature or the threshold water temperature to be lower with the radiant heater being operated than with the radiant heater not being operated.

Therefore, the deterioration of the sensory warmth can be compensated by the radiant heat from the radiant heater while the radiant heater is operating when the engine stops in response to the idling stop control, when a room temperature of a vehicle compartment is low, and/or when the air outlet temperature, which is a temperature of air flowing out of the air conditioner, is low. As such, regarding the idling stop enabling condition for stopping the engine in response to the idling stop control, the air-conditioning control device sets the threshold room temperature or the threshold water temperature to be lower with the radiant heater being operated than with the radiant heater not being operated. As such, since the idling stop mode can be performed in various idling stop enabling conditions, the air-conditioning control device can decrease the fuel consumption thereby reducing the volume of exhaust gas.

In a eleventh aspect, the air-conditioning control device includes the determination section and the time extending section. The determination section determines whether the radiant heater is operating. The time extending section sets the stop time from stopping the engine in response to the idling stop control to outputting the cancel signal, which allows the engine having been stopped in the idling stop control to restart, to be longer with the radiant heater being operated than with the radiant heater being stopped.

In a twelfth aspect, a vehicle control system includes an air conditioner, a radiant heater, and an idling stop controller. The air conditioner heats an inside of a vehicle compartment using engine cooling water. The radiant heater is supplied with power to increase a surface temperature thereof and heats the occupant using radiant heat. The idling stop controller extends a stop time from stopping the engine in response to the idling stop control to outputting the cancel signal, which allows the engine having been stopped in the idling stop control to restart, to be longer with the radiant heater being operated than with the radiant heater not being operated.

As such, according to the vehicle control system, the time duration during which the idling stop mode is performed can be extended. As a result, the fuel consumption decreases, therefore the volume of exhaust gas can be reduced. In addition, the vehicle control system can extend the time duration, during which the idling stop mode is performed, even in a case where the idling stop mode is performed with the engine cooling water having a relatively low temperature.

The idling stop controller is configured by at least one of an air-conditioning control device or a vehicle control device.

In a thirteenth aspect, the radiant heater is positioned to heat an area including at least a part of an area heated by air flowing from the air conditioner toward the lower leg.

As such, the deterioration of the sensory warmth, applied to the occupant, due to the decrease of the air outlet temperature of the air conditioner in the idling stop mode can be compensated by radiant heat from the radiant heater.

The invention claimed is:

1. A vehicle control system comprising:
   an air conditioner that is configured to heat an inside of a vehicle compartment using engine cooling water from an engine;
   a radiant heater for heating an occupant, the radiant heater being configured to generate radiant heat by increasing a temperature of a surface of the radiant heater when energized; and
   an idling stop controller for stopping the engine in response to an idling stop control, the idling stop controller configured to output a cancel signal allowing the engine to restart following the engine having been stopped in response to the idling stop control such that an idling stop time is longer when the radiant heater is operated than when the radiant heater is not operated.

2. The vehicle control system of claim 1, wherein the radiant heater is positioned to heat an area including at least a part of an area heated by air discharged from the air conditioner toward a lower leg of the occupant.

* * * * *